US012597966B2

(12) United States Patent
Minotani et al.

(10) Patent No.: US 12,597,966 B2
(45) Date of Patent: Apr. 7, 2026

(54) COMMUNICATION DEVICE AND COMMUNICATION METHOD

(71) Applicant: Panasonic Intellectual Property Corporation of America, Torrance, CA (US)

(72) Inventors: Jun Minotani, Ishikawa (JP); Yoshio Urabe, Nara (JP); Takashi Iwai, Ishikawa (JP); Tomofumi Takata, Ishikawa (JP); Hiroyuki Kanaya, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 455 days.

(21) Appl. No.: 18/042,986

(22) PCT Filed: Jun. 22, 2021

(86) PCT No.: PCT/JP2021/023579
§ 371 (c)(1),
(2) Date: Feb. 24, 2023

(87) PCT Pub. No.: WO2022/044512
PCT Pub. Date: Mar. 3, 2022

(65) Prior Publication Data
US 2023/0327717 A1      Oct. 12, 2023

(30) Foreign Application Priority Data

Aug. 27, 2020    (JP) ................................. 2020-143901

(51) Int. Cl.
H04B 7/0452        (2017.01)
H04B 7/0417        (2017.01)

(52) U.S. Cl.
CPC ......... H04B 7/0452 (2013.01); H04B 7/0417 (2013.01)

(58) Field of Classification Search
None
See application file for complete search history.

(56) References Cited

U.S. PATENT DOCUMENTS 11,337,263 B2 *   5/2022  Zhou ...................... H04L 1/1621
2015/0365153 A1 *  12/2015  Kim ..................... H04B 7/0413
370/329

(Continued)

FOREIGN PATENT DOCUMENTS

CN         107534472 A      1/2018
EP           3651498 A1      5/2020

(Continued)

OTHER PUBLICATIONS

Aio, et al., "Consideration on Multi-AP Sounding," IEEE 802.11-19/1134r1, Aug. 9, 2019, 14 pages.

(Continued)

*Primary Examiner* — Marcus Smith
*Assistant Examiner* — Francesca Lima Santos
(74) *Attorney, Agent, or Firm* — Seed Intellectual Property Law Group LLP

(57)          ABSTRACT

The present invention improves the efficiency of transmissions in a multilink. A communication device according to the present invention comprises: a control circuit that controls multilink transmissions on the basis of control information related to the multilink transmissions; and a transmission circuit that performs the multilink transmissions in accordance with the control of the multilink transmissions.

16 Claims, 26 Drawing Sheets

(56) References Cited

U.S. PATENT DOCUMENTS

| | | | | |
|---|---|---|---|---|
| 2016/0204841 A1* | 7/2016 | Kim | ..................... | H04B 7/0417 |
| | | | | 370/312 |
| 2018/0138959 A1 | 5/2018 | Chun et al. | | |
| 2019/0132762 A1 | 5/2019 | Zhu et al. | | |
| 2019/0150214 A1 | 5/2019 | Zhou et al. | | |
| 2019/0191476 A1* | 6/2019 | Zhang | ............. | H04W 36/00837 |
| 2020/0280827 A1 | 9/2020 | Fechtel et al. | | |
| 2022/0240333 A1* | 7/2022 | Jang | ..................... | H04W 76/15 |

FOREIGN PATENT DOCUMENTS

| | | | |
|---|---|---|---|
| WO | 2019021680 A1 | 1/2019 | |
| WO | WO 2019006085 A1 | 1/2019 | |

OTHER PUBLICATIONS

IEEE Standards Association, "IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Computer Society, 3534 pages.

International Search Report, mailed Sep. 21, 2021, for International Application No. PCT/JP2021/023579, 5 pages (with English translation).

IEEE Computer Society, "Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN," 802.11 Working Group, LAN/MAN Standards Committee, IEEE P802.11ax/D6.0, Nov. 2019, 780 pages.

Lou, et al. "Feedback Overhead Analysis for 16 Spatial Stream MIMO," IEEE 802.11-19/0828r4, May 9, 2019, 21 pages.

Patil, et al. "Multi-Link Operation: Design Discussion," IEEE 802.11-19/0823r2, Sep. 17, 2019, 11 pages.

Hearing Notice, dated Sep. 3, 2025, for Indian Patent Application No. 202317009047. (2 pages).

Aio et al., "Consideration on Multi-AP Sounding." doc.: IEEE 802.11-19/1134r0, Sony Corporation, Jul. 15, 2018. (13 pages).

* cited by examiner

| Category | HE Action | HE MIMO Control | HE Compressed Beamforming Report | HE MU Exclusive Beamforming Report |
|---|---|---|---|---|

Maximum number of link

101

Maximum number of link of AP

10

| Feedback SS start index | Feedback SS end index |
|---|---|

FIG. 18

| Channel start index | Channel end index |
|---|---|

FIG. 19

| Feedback info type bit | Feedback info type |
|---|---|
| 00 | Average SNR of Space-Time Stream in Compressed Beamforming Report field |
| 01 | Compressed beamforming feedback matrix in Compressed Beamforming Report Information |
| 10 | Delta SNR for each space-time stream per subset of subcarrier in Exclusive Beamforming Report Information Report |
| 11 | Average SNR of each space-time stream per RU in HE CQI Report Information |

FIG. 20

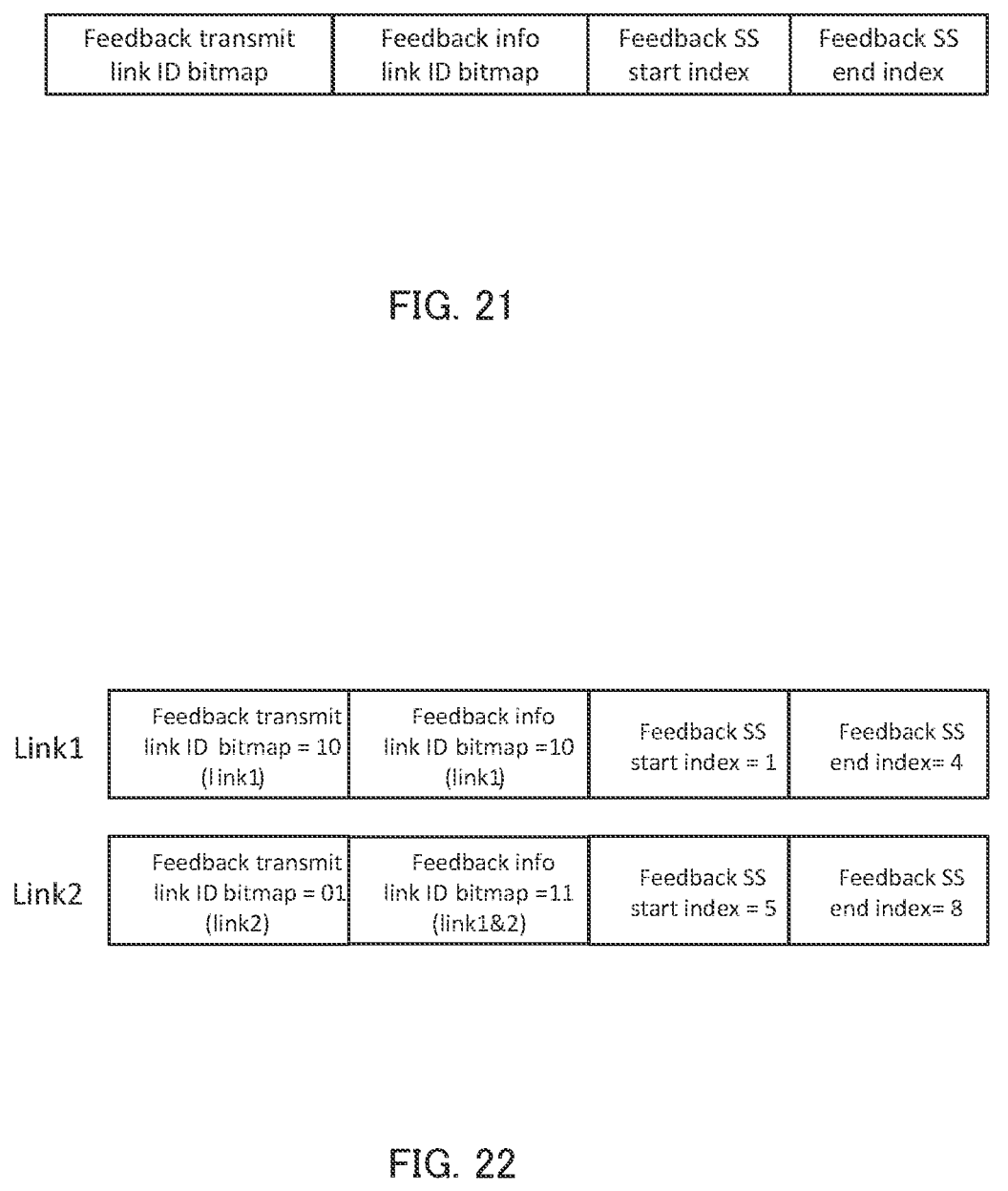

| Feedback transmit link ID bitmap | Feedback info link ID bitmap | Feedback SS start index | Feedback SS end index |
|---|---|---|---|

FIG. 21

| | Feedback transmit link ID bitmap = 10 (link1) | Feedback info link ID bitmap =10 (link1) | Feedback SS start index = 1 | Feedback SS end index= 4 |
|---|---|---|---|---|
| Link1 | | | | |

| | Feedback transmit link ID bitmap = 01 (link2) | Feedback info link ID bitmap =11 (link1&2) | Feedback SS start index = 5 | Feedback SS end index= 8 |
|---|---|---|---|---|
| Link2 | | | | |

| Feedback info link ID bitmap | Feedback SS start index | Feedback SS end index |
|---|---|---|

FIG. 27

| BW | Channel ID |
|----|-----------|

FIG. 31

| BW bit | Channel BW | Channel ID bit | Channel ID |
|--------|-----------|----------------|-----------|
| 00 | 2.4GHz | 0000 | 1ch |
|  |  | 0001 | 2ch |
|  |  | ... | ... |
| 01 | 5GHz | 0000 | 36ch |
|  |  | 0001 | 40ch |
| 11 | 6GHz | ... | ... |

FIG. 32

| BW | channel offset |
|----|----------------|

FIG. 33

| BW bit | Channel BW | ΔChannel freq. |
|--------|------------|----------------|
| 00 | 2.4GHz | 5MHz |
| 01 | 5GHz | 20MHz |

FIG. 34

COMMUNICATION DEVICE AND COMMUNICATION METHOD

TECHNICAL FIELD

The present disclosure relates to a communication apparatus and a communication method.

BACKGROUND ART

The Task Group (TG) be has been developing the technical specification of the Institute of Electrical and Electronics Engineers (IEEE) 802.11be (hereinafter, referred to as "11be") as the successor standard of 802.11ax (hereinafter, referred to as "11ax"), which is a standard of IEEE 802.11.

Discussions have been proceeding for 11be on the increase, from 11ax, in the maximum number of spatial streams (SSs), e.g., also referred to as the number of spatial multiplexing, in downlink (DL) multi-user multiple-input multiple output (MU-MIMO), for example. The increase in the maximum number of spatial streams improves spectrum efficiency.

CITATION LIST

Non Patent Literature

NPL 1
IEEE 802.11-19/0828r4, feedback-overhead-analysis-for-16-spatial-stream-mimo, May, 2019
NPL 2
IEEE P802.11ax D6.0, November 2019
NPL 3
IEEE Std 802.11, 2016
NPL 4
IEEE 802.11-19/0823r2, Multi-Link Operation: Design Discussion

SUMMARY OF INVENTION

There is scope for further study, however, on transmission processing in Multi-Link.

One non-limiting and exemplary embodiment facilitates providing a base station, a terminal, and a communication method each capable of improving transmission efficiency in Multi-Link.

A communication apparatus according to an embodiment of the present disclosure includes: control circuitry, which, in operation, executes control for transmission of first information, based on second information on transmission of the first information via a plurality of links; and transmission circuitry, which, in operation, performs the transmission of the first information in accordance with the control.

It should be noted that general or specific embodiments may be implemented as a system, an apparatus, a method, an integrated circuit, a computer program, a storage medium, or any selective combination thereof.

According to an exemplary embodiment of the present disclosure, it is possible to improve transmission efficiency in Multi-Link.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 illustrates an exemplary High efficiency (HE) Compressed Beamforming/channel quality indicator (CQI) frame action field format;

FIG. 18 illustrates an exemplary field that indicates a start point and an end point of a spatial stream;

FIG. 19 illustrates an exemplary field that indicates a start point and an end point of a channel index;

FIG. 20 illustrates an exemplary field that indicates a feedback information type;

FIG. 21 illustrates an exemplary feedback request signal;

FIG. 22 illustrates a configuration example of the feedback request signal;

FIG. 23 illustrates an exemplary Trigger frame;

FIG. 27 illustrates an example of feedback information;

FIG. 31 illustrates an exemplary field that indicates a combination of a frequency band and a channel identifier;

FIG. 32 illustrates exemplary frequency band and channel identifier;

FIG. 33 illustrates an exemplary combination of the frequency band and a frequency offset; and FIG. 34 illustrates exemplary frequency band and frequency offset.

DESCRIPTION OF EMBODIMENTS

Hereinafter, embodiments of the present disclosure will be described in detail with reference to the accompanying drawings.

In the 802.11 standard, for example, when Space-Time Block Coding (STBC) is not performed, a single modulation symbol stream is generated from a single bit stream, and when the space-time block coding is performed, two or more modulation symbol streams are generated from a single bit stream. For example, a spatially multiplexed bit stream may be referred to as a "spatial stream" and a spatially multiplexed modulation symbol stream may be referred to as a "space-time stream (STS)," and they could be distinguished from each other. When the space-time block coding is not performed, for example, the number of space-time streams is equal to the number of spatial streams.

The following description is about an example in which the space-time block coding is not performed. In other words, the spatial stream and the space-time stream are not distinguished in the following description, and the "spatial stream" refers to a spatial channel used for spatial multiplexing. The spatial stream in the following description, however, may be interpreted as the space-time stream when the space-time block coding is performed.

[Beamforming]

A beamforming technique is used in the DL MU-MIMO. The beamforming technique improves communication quality in DL.

In the DL MU-MIMO beamforming, for example, weighting (e.g., also referred to as "steering," "spatial mapping," or "transmission precoding") to control the amplitude and phase is performed to give orthogonality to signals addressed to respective users. A matrix indicating the weighting (hereinafter, referred to as a "steering matrix") can be derived, for example, based on information of a propagation path (e.g., also referred to as a "channel") estimated by the beamforming (see, for example, NPL 1).

Figure 1:
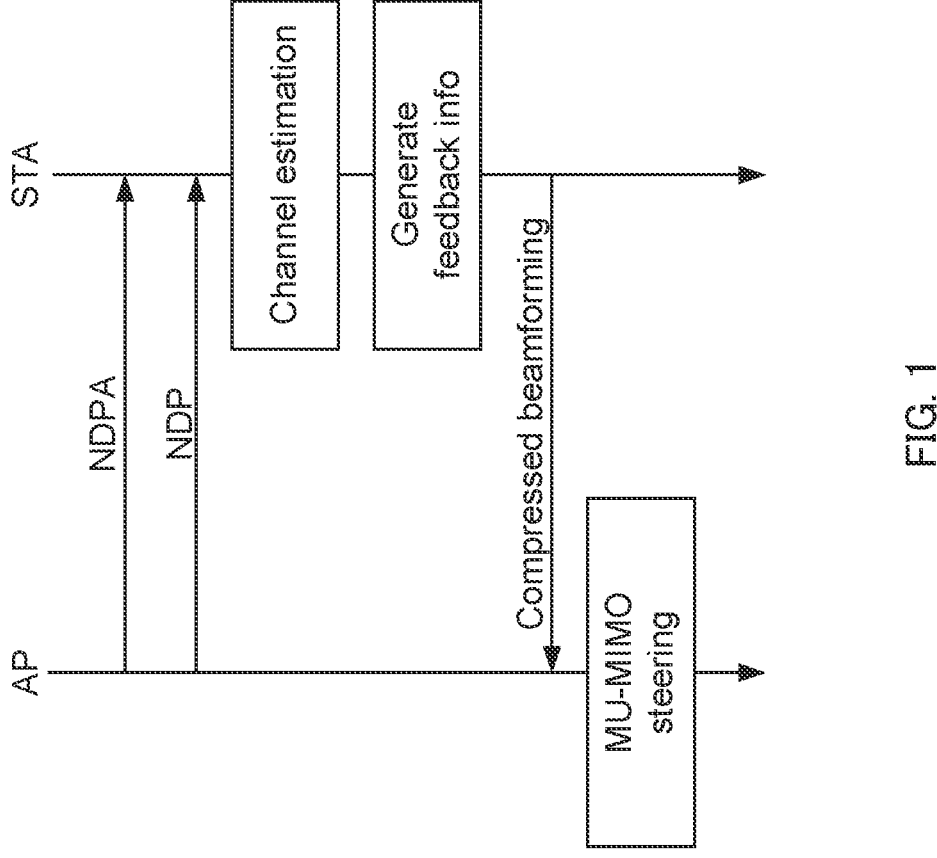
FIG. 1 is a sequence diagram illustrating exemplary beamforming by null data packet (NDP) sounding and explicit feedback.

11ax supports a method of using null data Packet (NDP) sounding and explicit feedback as an example of beamforming techniques (see, for example, NPL 2). FIG. 1 is a sequence diagram illustrating exemplary beamforming by the NDP sounding and explicit feedback.

In FIG. 1, an access point (AP, also referred to as a "base station") transmits an NDP announcement (NDPA) to each terminal (e.g., also referred to as a "station (STA)"), for example. The AP indicates transmission of an NDP to the STA by transmitting the NDPA.

The AP transmits the NDP to the STA following the NDPA.

After receiving the NDP, the STA estimates a channel based on a signal (e.g., non-legacy long training field (non-legacy LTF)) included in the NDP.

Note that, when a steering matrix is added to the non-Legacy LTF, for example, the STA may estimate a channel including a steering matrix (e.g., also referred to as an "effective channel") regardless of whether the received signal is an NDP or a non-NDP. The following description simply uses the term "propagation path response" (also referred to as a "propagation path characteristic," "channel response," "channel estimate matrix," or "channel matrix") regardless of whether it is a channel or an effective channel. The STA determines feedback information to transmit to the AP in response to the NDP, based on the channel estimation value, for example.

For example, the STA transmits the compressed feedback information to the AP by using a method called "Compressed beamforming." The AP performs reception processing on the feedback information transmitted from the STA and determines, based on the received feedback information, resource allocation information and a transmission parameter for the destination STA or each STA (also referred to as "scheduling"). Moreover, the AP may derive, based on the feedback information, a steering matrix so as to perform DL transmission (e.g., MU-MIMO) for the STA.

Figure 2:
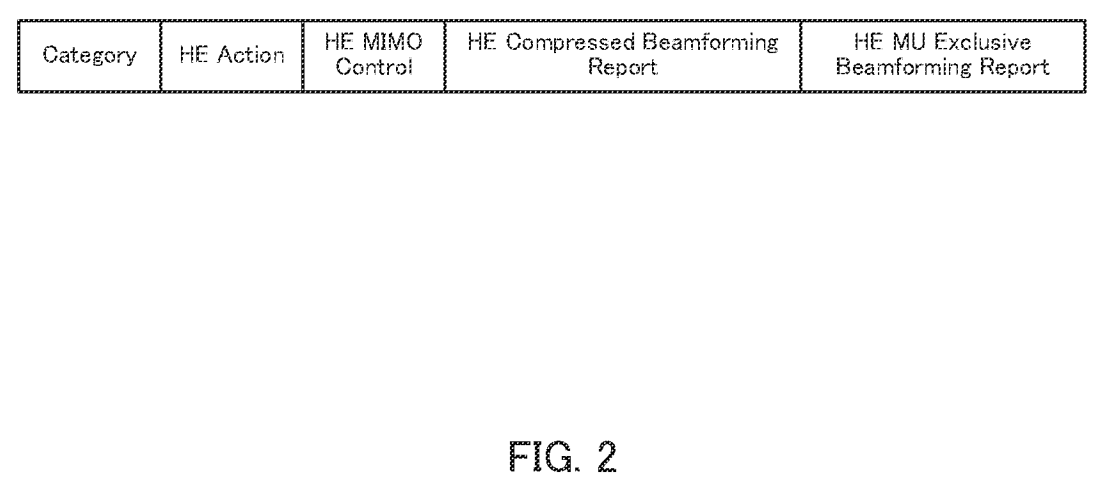

FIG. 2 illustrates an exemplary configuration of the feedback information transmitted from the STA to the AP. FIG. 2 illustrates an exemplary Compressed Beamforming/CQI frame action field format, by way of example. Further, FIG. 2 illustrates, as an example, an exemplary configuration for a feedback type=MU (Multi-User) which will be described later.

The feedback information is classified into, for example, "HE compressed Beamforming Report," "HE MU Exclusive Beamforming Report," and "HE Channel Quality Information (CQI) Report." The HE Compressed Beamforming Report may include, for example, reception quality for each spatial stream (e.g., mean Signal-to-Noise Ratio (SNR)), and a feedback matrix whose informational amount is compressed in a prescribed manner. The HE MU Exclusive Beamforming Report may include, for example, a value of the difference obtained by subtracting the mean reception quality of each spatial stream (e.g., mean SNR) from reception quality for each subcarrier (e.g., SNR). Further, the HE CQI Report may include, for example, the mean reception quality (e.g., mean SNR) of the spatial streams in 26-tone Resource Unit (RU) units.

The STA may, for example, determine feedback information to be transmitted to the AP in response to the NDP, based on a feedback type indicated in a "Feedback Type And Ng subfield" included in the NDPA. For example, in a case where the feedback type=SU (Single User), the STA may feed back the HE compressed Beamforming Report. Meanwhile, in a case where the feedback type=MU (e.g., FIG. 2), the STA may feed back the HE compressed Beamforming Report and the HE MU Exclusive Beamforming Report. Further, in a case where the feedback type=CQI, the STA may feed back the HE CQI Report.

Further, 802.11n also supports "Staggered sounding" as another example of beamforming techniques (see, for example, NPL 3).

Figure 3:
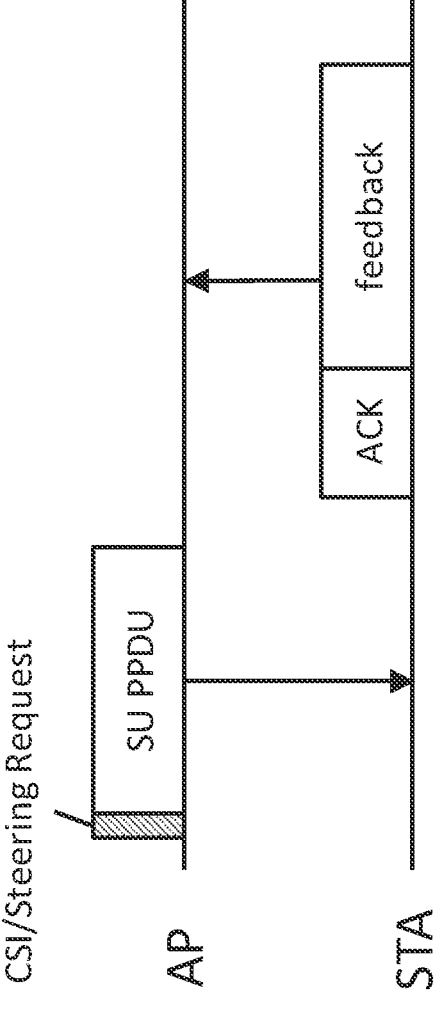
FIG. 3 is a sequence diagram illustrating exemplary staggered sounding.

FIG. 3 is a sequence diagram describing an exemplary operation of the staggered sounding.

The staggered sounding is a beamforming technique for single-user MIMO (SU-MIMO). An AP, for example, transmits a signal (e.g., SU Physical layer convergence procedure Protocol Data Unit (PPDU)) including a data portion (e.g., also referred to as a data field) to an STA. The STA determines whether to transmit feedback information, for example, based on channel state information (CSI)/Steering Request included in the medium access control (MAC) layer of the signal transmitted from the AP. When transmission of the feedback information is indicated (feedback information transmission: Yes), for example, the STA feeds back a channel estimation value obtained based on the signal (e.g., non-legacy LTF) included in the signal transmitted from the AP. For example, the STA may add the channel estimation value (i.e., feedback information) to a response signal (e.g., Acknowledgement (ACK) or Block ACK (BA)), and transmit the signal to the AP based on a feedback method indicated in the CSI/Steering Request.

[Multi-Link Operation]

Discussions have been proceeding for 11be on a multi-link operation (hereinafter, referred to as "Multi-Link") in which transmission and reception are performed using a plurality of links (e.g., simultaneously perform transmission and reception) between Multi-Link devices (MLDs) in each of which a plurality of APs or STAs is connected to one MAC Service Access Point (SAP) (e.g., see NPL 4).

Multi-Link attempts to improve throughput and latency by transmitting (e.g., simultaneously transmitting) a MAC Service Data Unit (MSDU) having a single Traffic Identifier (TID) on a plurality of links, for example.

Figure 4:
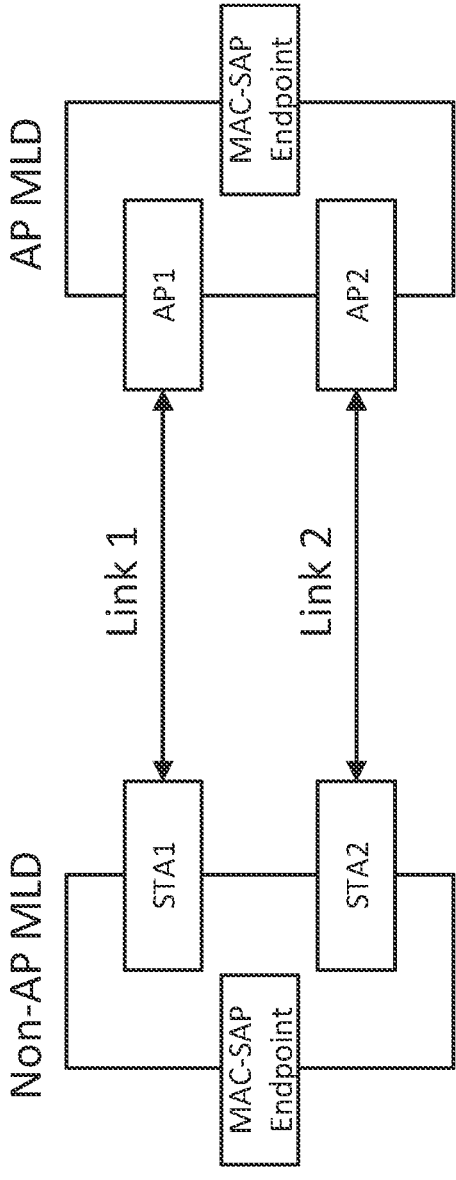
FIG. 4 illustrates an exemplary multi-link operation system.

FIG. 4 illustrates an exemplary Multi-Link system. In the example illustrated in FIG. 4, Multi-Link is performed using two links of link 1 between AP1 and STA1 and link 2 between AP2 and STA2.

In Multi-Link, a MLD including an AP is referred to as an "AP MLD," and a MLD including an STA that is not an AP is referred to as a "non-AP MLD." A link used in Multi-Link may be a plurality of links in the same band or may be a plurality of links in different bands.

Further, in Multi-Link, an AP MLD/a non-AP MLD capable of transmitting and receiving (e.g., simultaneously transmitting and receiving) on a plurality of links is referred to as a "Simultaneous Tx and Rx (STR) AP MLD/STR non-AP MLD." On the other hand, an AP MLD/a non-AP MLD not capable of transmitting and receiving on the plurality of links is referred to as a "Non-STR AP MLD/Non-STR non AP MLD."

Figure 5:
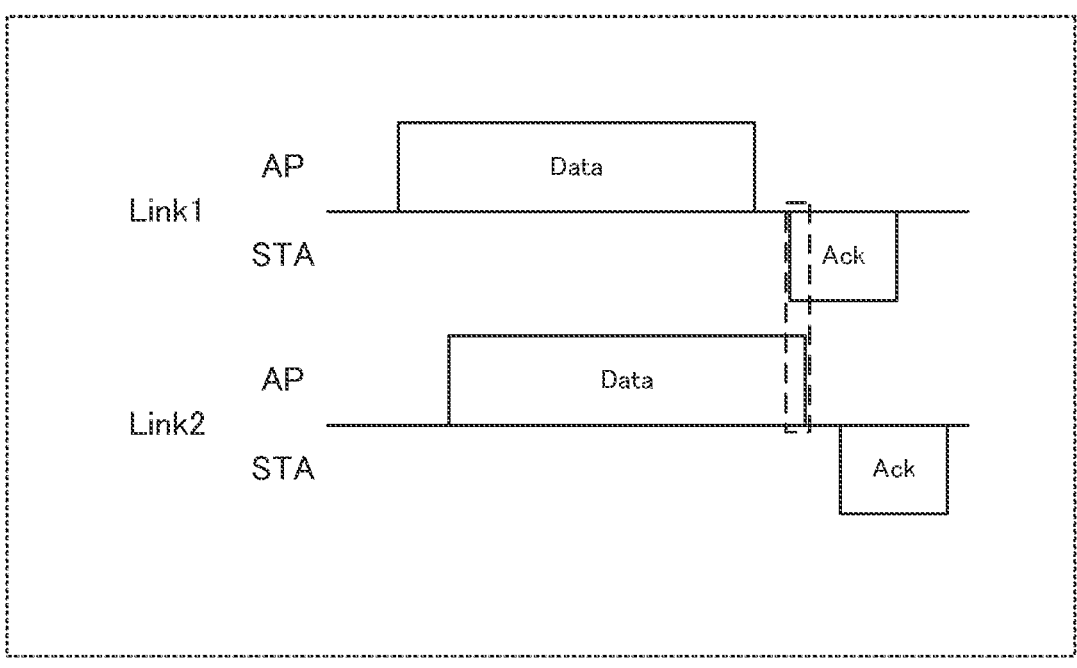
FIG. 5 illustrates an exemplary operation of a Simultaneous Tx and Rx (STR) access point (AP) Multi-Link device (MLD)
Figure 6:
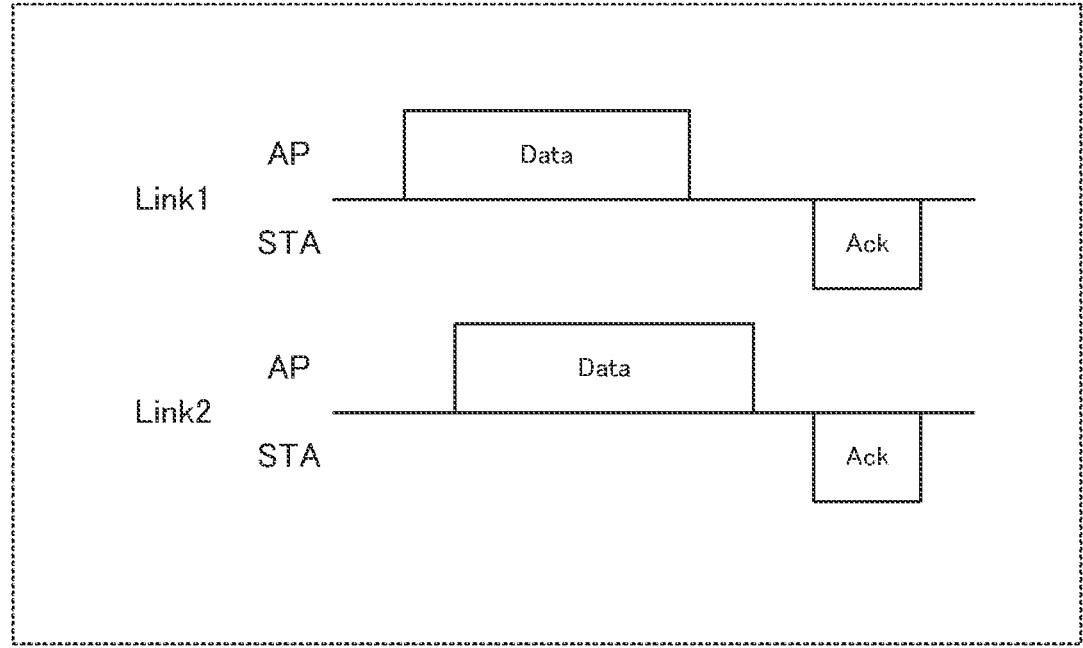
FIG. 6 illustrates an exemplary operation of a Non-STR AP MLD.

FIG. 5 illustrates an exemplary operation of an STR AP MLD, and FIG. 6 illustrates an exemplary operation of a Non-STR AP MLD. In FIG. 5, the STR AP MLD is capable of transmitting data to the STA via link 2 while receiving an ACK signal (Ack) from the STA via link 1, for example. On the other hand, in FIG. 6, since the simultaneous transmission and reception on a plurality of links are not allowed (or are avoided), the Non-STR AP MLD may perform scheduling where a data transmission timing and a reception timing of an ACK signal do not overlap in a case where data transmission is performed at different timings for each link, for example.

Multi-Link has been described, thus far.

However, discussions have not been fully made on a method of transmitting feedback information from an STA to an AP in Multi-Link (e.g., Multi-Link feedback). For example, the amount of feedback information to be transmitted from the STA to the AP may be increased in proportion to the maximum number of spatial streams. For this reason, in 11be where the maximum number of spatial streams may be increased, a method to improve the transmission efficiency in Multi-Link (e.g., frequency utilization efficiency of multi-link feedback) is expected.

An exemplary embodiment of the present disclosure will describe a method to improve the frequency utilization efficiency in the multi-link feedback.

[Configuration of Radio Communication System]

A Radio communication system according to an exemplary embodiment of the present disclosure includes at least one AP MLD and one non-AP MLD.

For example, an AP MLD (e.g., also referred to as a "downlink radio transmission apparatus" in DL communication) transmits control information to a non-AP MLD (e.g., also referred to as a "downlink radio reception apparatus" in DL communication). The Non-AP MLD, for example, performs transmission of feedback information to the AP MLD (e.g., Uplink (UL) SU transmission or UL MU transmission) using one or more links indicated in the control information from among a plurality of links.

In the following, for example, suppose that an MLD is a non-limiting example of an apparatus included in the radio communication system, an AP MLD is sometimes referred to as an "AP," and a Non-AP MLD is sometimes referred to as an "STA," for convenience.

Incidentally, an MLD (e.g., AP MLD or Non-AP MLD) may be, for example, an apparatus (e.g., device) having one or more STAs (e.g., STA affiliated to MLD (affiliated STA)). The MLD may also be, for example, an apparatus having one MAC SAP including one MAC data service, for logical link control (e.g., LLC).

The MLD may also be configured logically or physically. For example, the MLD may be one physical apparatus having a logical function of an STA or an AP corresponding to each of a plurality of links as illustrated in FIG. 4. Alternatively, for example, the MLD may configured with separate physical apparatuses (STA or AP) respectively corresponding to the plurality of links as illustrated in FIG. 4.

The MLD may also have one STA. Further, for example, an MAC address (e.g., wireless medium (WM) MAC) for each of a plurality of STAs included in the MLD (e.g., affiliated STAs) may be identical or different.

Meanwhile, the AP MLD may be, for example, an MLD including an AP (i.e., MLD in which affiliated STA is AP). Further, the Non-AP MLD may be, for example, an MLD including an STA (i.e., MLD in which affiliated STA is non-AP STA).

In the following, as an example, a description will be given of a method in which an STA performs multi-link feedback transmission based on control information transmitted by an AP, in the NDP sounding in 11ax.

Figure 7:
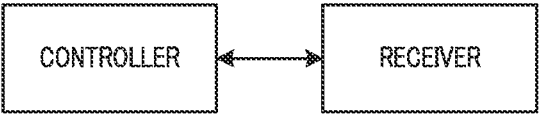
FIG. 7 is a block diagram illustrating an exemplary configuration of a part of an AP MLD according to Embodiment 1.

FIG. 7 is a block diagram illustrating an exemplary configuration of a part of AP 100 according to an exemplary embodiment of the present disclosure. In AP 100 illustrated in FIG. 7 (e.g., corresponding to communication apparatus), a controller (e.g., corresponding to control circuitry) controls reception of multi-link transmission performed by another communication apparatus (e.g., STA 200), based on control information on the multi-link transmission. A receiver (e.g., reception circuitry) performs reception of the multi-link transmission performed by the other communication apparatus in accordance with the control of the reception.

Figure 8:
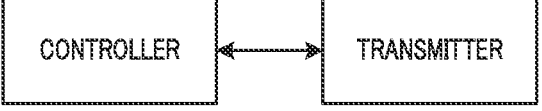
FIG. 8 is a block diagram illustrating an exemplary configuration of a part of a Non-AP MLD according to Embodiment 1.

FIG. 8 is a block diagram illustrating an exemplary configuration of a part of STA 200 according to an exemplary embodiment of the present disclosure. In STA 200 illustrated in FIG. 8 (e.g., corresponding to communication apparatus), a controller (e.g., corresponding to control circuitry) controls multi-link transmission, based on control information on the multi-link transmission. A transmitter (e.g., corresponding to transmission circuitry) performs multi-link transmission in accordance with the control of the multi-link transmission.

Embodiment 1

<Exemplary Configuration of AP 100>

Figure 9:
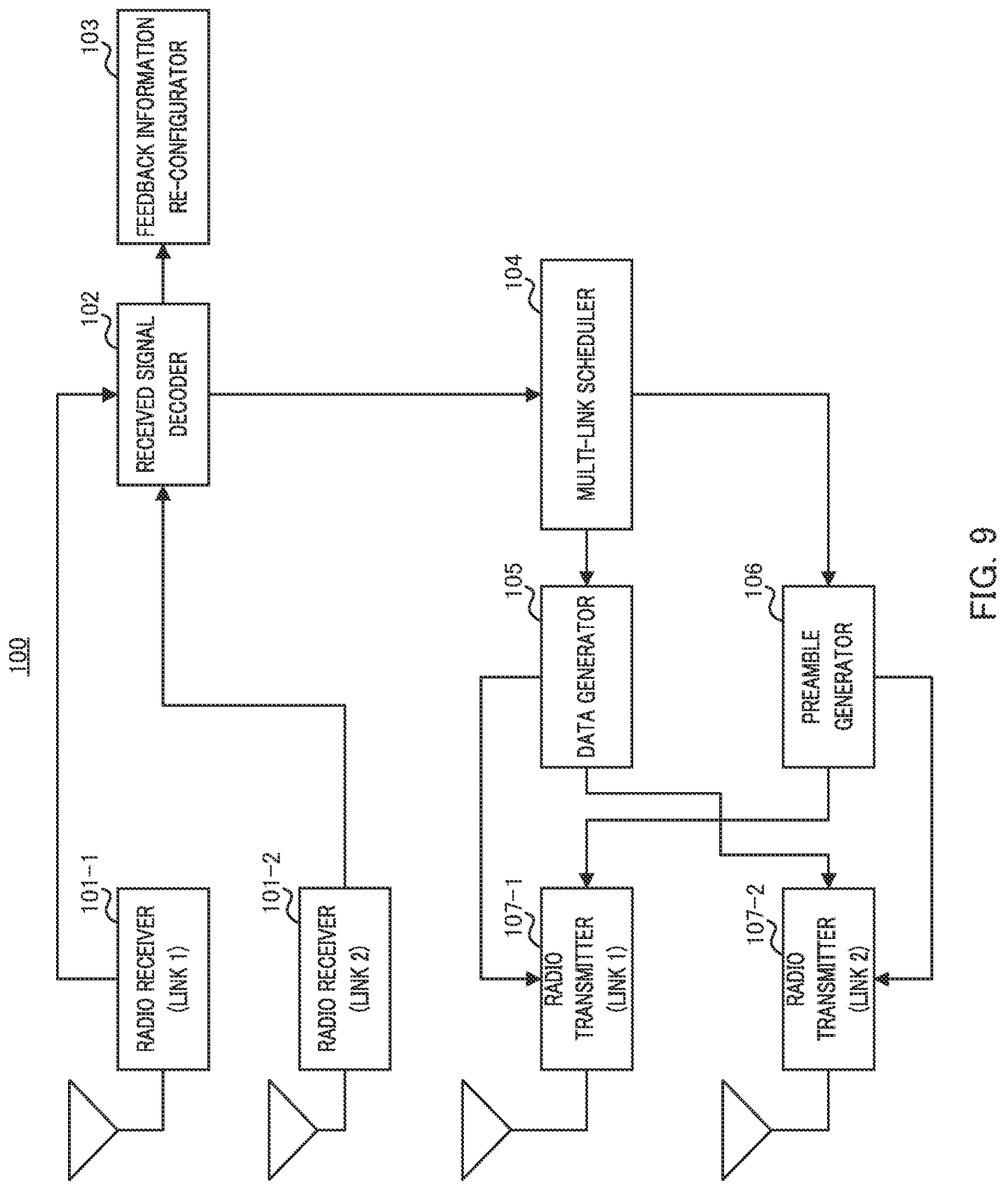
FIG. 9 is a block diagram illustrating an exemplary configuration of the AP MLD according to Embodiment 1.

FIG. 9 is a block diagram illustrating an exemplary configuration of AP 100 (e.g., downlink radio transmission apparatus or AP MLD). AP 100 illustrated in FIG. 9 may include, for example, radio receivers 101-1 and 101-2, received signal decoder 102, feedback information re-configurator 103, multi-link scheduler 104, data generator 105, preamble generator 106, and radio transmitters 107-1 and 107-2.

Incidentally, for example, received signal decoder 102, feedback information re-configurator 103, multi-link scheduler 104, data generator 105, and preamble generator 106 may be included in the controller illustrated in FIG. 7, and radio receivers 101-1 and 101-2 may be included in the receiver illustrated in FIG. 7.

Further, for example, radio receiver 101-1 and radio transmitter 107-1 are configurators of an AP for performing communication using link 1 (e.g., AP 1 illustrated in FIG. 4), whereas radio receiver 101-2 and radio transmitter 107-2 are configurators of an AP for performing communication using link 2 (e.g., AP 2 illustrated in FIG. 4).

Further, FIG. 9 illustrates an exemplary configuration of AP 100 provided with two links, but the number of links is not limited to two and may be three or more.

Each of radio receivers 101-1 and 101-2 for the respective links receives a signal transmitted from STA 200 (e.g., downlink radio receiver or non-AP MLD) via an antenna and performs radio reception processing such as down-conversion and Analog-to-Digital (A/D) conversion on the received signal. Each of radio receiver 101-1 and 101-2, for example, divides the received signal after the radio reception processing into a Preamble unit (also referred to as a "Preamble signal") and a data unit (also referred to as a "data signal") and outputs the resulting units to received signal decoder 102.

Received signal decoder 102 may, for example, perform demodulation processing such as a Fast Fourier Transform (FFT) on each of the Preamble signal and the data signal input from radio receivers 101-1 and 101-2 for the respective links, and extract control signals each included in the Preamble signal and the data signal. Each of the control signals may include, for example, a frequency bandwidth, a Modulation and Channel Coding Scheme (MCS), or a coding method.

Received signal decoder 102 may, for example, also perform channel equalization on the data signal after the FFT, demodulate and decode the data signal, and perform error determination such as a Cyclic Redundancy Check (CRC) by using the control signal acquired from the Preamble signal and a channel estimation signal. When no error (i.e., decoding error) is included in the data signal, received signal decoder 102 outputs the decoded data signal to feedback information re-configurator 103 and multi-link scheduler 104, for example. On the other hand, when an error is included in the data signal, received signal decoder 102 need not output the decoded data signal, for example.

Feedback information re-configurator 103, based on the data signal input from received signal decoder 102 (e.g., control information on distribution method of feedback information), performs re-configuration of the feedback information input from received signal decoder 102 for each link or for each type of feedback information (hereinafter may also be referred to as "feedback information type"), for example. Feedback information re-configurator 103 may output the re-configured feedback information to a processor that is not illustrated. Note that, the "distribution method" may be abbreviated as "distribution" and may be mutually replaced with other terms such as "assignment (method)" and "mapping (method)" for a plurality of links.

Multi-link scheduler 104 performs scheduling of Multi-Link, for example.

For example, multi-link scheduler 104 may determine whether to request the multi-link feedback transmission from STA 200, based on the data signal input from received signal decoder 102 (e.g., information on status of STA 200 for each link (e.g., Network Allocation Vector (NAV) status information)).

By way of example, when requesting the multi-link feedback transmission from STA 200, multi-link scheduler 104 determines scheduling for the multi-link feedback transmission based on the data-signal input from received signal decoder 102. The scheduling for the multi-link feedback transmission includes, for example, scheduling for transmission of control information on a link used in the multi-link feedback, scheduling for a link used in transmitting the feedback information in STA 200, or scheduling for distribution of the feedback information to each link in STA 200. Multi-link scheduler 104 outputs the control information on the scheduling to at least one of data generator 105 and preamble generator 106, for example.

Data generator 105 generates a data sequence to be transmitted via each link addressed to STA 200, based on scheduling information input from multi-link scheduler 104, for example. Data generator 105 may, for example, encode the generated data sequence, assign the encoded data sequence to a frequency band of a channel (e.g., channel acquired by carrier sense), perform modulation and Inverse Fast Fourier Transform (IFFT) processing, and thereby generate a data signal. Data generator 105 outputs the generated data signal to each of radio transmitters 107-1 and 107-2 for the respective links.

Preamble generator 106 generates a preamble signal based on the scheduling information input from multi-link scheduler 104. The preamble signal may include, for example, a reference signal. For example, preamble generator 106 performs modulation and IFFT processing on the preamble signal and outputs the preamble signal to each of radio transmitters 107-1 and 107-2 for the respective links.

Each of radio transmitters 107-1 and 107-2 for the respective links generates a radio frame (e.g., may be referred to as a "packet signal") that includes the data signal input from data generator 105 and the preamble signal input from preamble generator 106. Each of radio transmitters 107-1 and 107-2 performs, on the generated radio frame, radio transmission processing such as D/A conversion and up-conversion for carrier frequency, and transmits the signal after the radio transmission processing to STA 200 via the antenna.

<Exemplary Configuration of STA 200>

Figure 10:
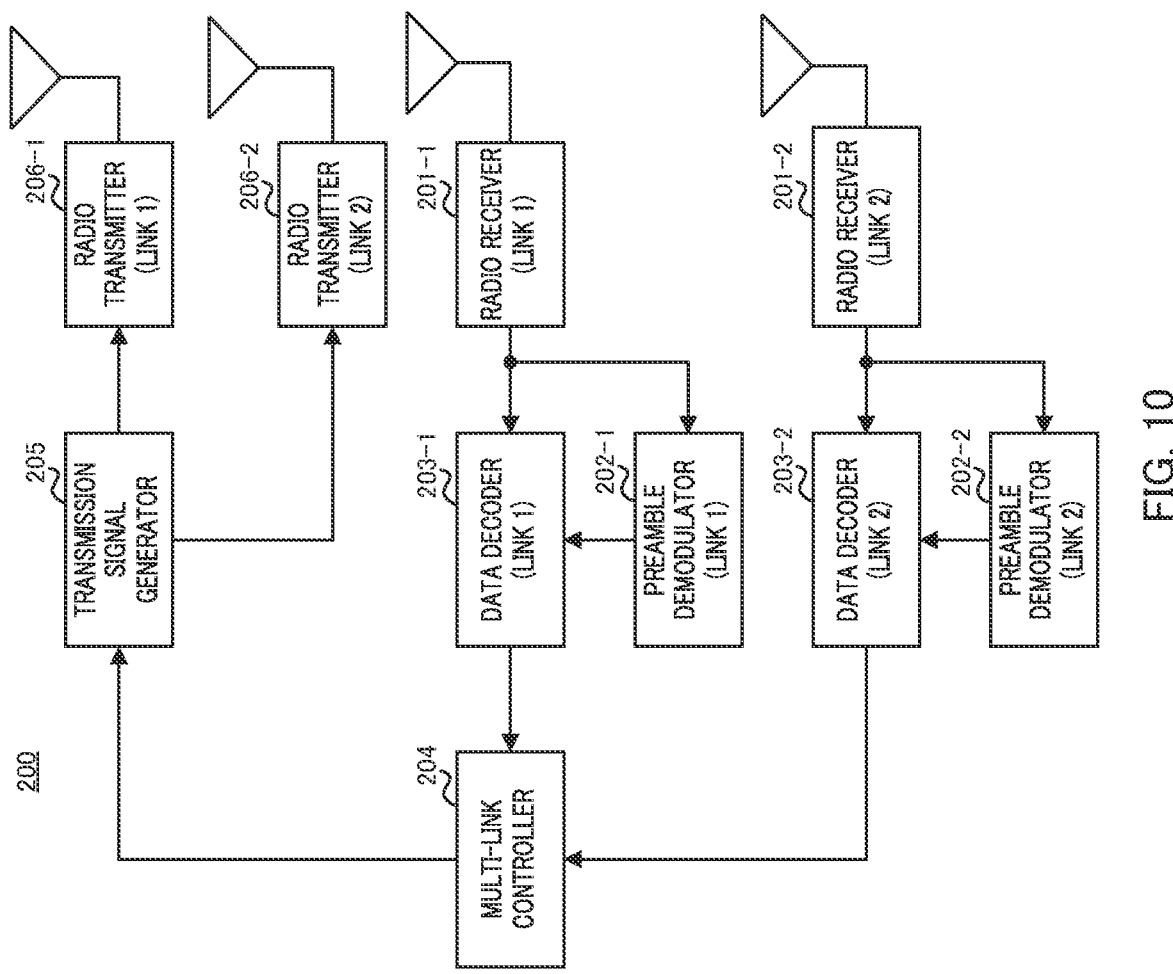
FIG. 10 is a block diagram illustrating an exemplary configuration of the Non-AP MLD according to Embodiment 1.

FIG. 10 is a block diagram illustrating an exemplary configuration of STA 200 (e.g., downlink radio reception apparatus or Non-AP MLD). STA 200 illustrated in FIG. 10 may include, for example, radio receivers 201-1 and 201-2, preamble demodulators 202-1 and 202-2, data decoders 203-1 and 203-2, multi-link controller 204, transmission signal generator 205, and radio transmitters 206-1 and 206-2.

For example, preamble demodulators 202-1 and 202-2, data decoders 203-1 and 203-2, multi-link controller 204, and transmission signal generator 205 may be included in the controller illustrated in FIG. 8, and radio transmitters 206-1 and 206-2 may be included in the transmitter illustrated in FIG. 8.

Further, for example, radio receiver 201-1, preamble demodulator 202-1, data decoder 203-1, and radio transmitter 206-1 are configurators of an STA for performing communication using link 1 (e.g., STA 1 illustrated in FIG. 4), whereas radio receiver 201-2, preamble demodulator 202-2, data decoder 203-2, and radio transmitter 206-2 are configurators of an STA using link 2 (e.g., STA 2 illustrated in FIG. 4).

Further, FIG. 10 illustrates an exemplary configuration of STA 200 provided with two links, but the number of links is not limited to two and may be three or more.

Each of radio receivers 201-1 and 201-2 for the respective links receives a signal transmitted from AP 100 via an antenna and performs radio reception processing such as down-conversion and A/D conversion on the received signal. Each of radio receiver 201-1 and 201-2 extracts a preamble signal from the signal after the radio reception processing and outputs the resulting preamble signal to each of preamble demodulators 202-1 and 202-2. Further, each of radio receiver 201-1 and 201-2 extracts a data signal from the signal after the radio reception processing and outputs the resulting data signal to each of data decoders 203-1 and 203-2.

Each of preamble demodulators 202-1 and 202-2 for the respective links performs demodulation processing such as FFT on the preamble signal input from each of radio receivers 201-1 and 201-2, and extracts, from the demodulated preamble signal, a control signal used in demodulating and decoding the data signal, for example. Further, each of preamble demodulators 202-1 and 202-2 may perform channel estimation based on a reference signal included in the Preamble signal. Each of preamble demodulators 202-1 and 202-2 outputs the extracted control signal and channel estimation information (e.g., channel estimation matrix) to each of data decoders 203-1 and 203-2.

Each of data decoders 203-1 and 203-2, for example, performs processing such as FFT processing, channel equalization, or demodulation on the data signal input from each of radio receivers 201-1 and 201-2, based on the control signal and the channel estimation information input from each of preamble demodulators 202-1 and 202-2, and thereby extracts demodulation data addressed to STA 200. Further, each of data decoders 203-1 and 203-2 decodes the extracted demodulation data based on the control signal input from each of preamble demodulators 202-1 and 202-2 to perform error determination such as CRC. When no error is included in the data signal, each of data decoders 203-1 and 203-2 outputs the decoded data to multi-link controller 204, for example. On the other hand, for example, when an error is included in the data signal, each of data decoders 203-1 and 203-2 need not output the decoded data.

Multi-link controller 204 may, for example, determine a link to be used in multi-link feedback or a distribution method of feedback information to each link, based on control information on the multi-link feedback included in the decoded data input from each of data decoders 203-1 and 203-2. Multi-link controller 204 outputs, to transmission signal generator 205, the control information including the information on the determined link or the distribution method of the feedback information.

Transmission signal generator 205 generates a data sequence including the feedback information, based on the control information input from multi-link controller 204. Transmission signal generator 205 assigns the generate data sequence to a frequency resource for each link, performs demodulation and IFFT processing, and thereby generates a data signal (e.g., transmission signal). In addition, transmission signal generator 205 adds, for each link, a preamble to the data signal to generate a radio frame (e.g., packet signal) and outputs the radio frame to each of radio transmitters 206-1 and 206-2 for the respective links. The "packet signal" may be abbreviated as a "packet."

Each of radio transmitters 206-1 and 206-2 performs, on the radio frame input from transmission signal generator 205, radio transmission processing such as D/A conversion and up-conversion for carrier frequency, and transmits the signal after the radio transmission processing to AP 100 via the antenna.

[Exemplary Operations of AP 100 and STA 200]

Next, exemplary operations of AP 100 and STA 200 of the present embodiment will be described.

Figure 11:
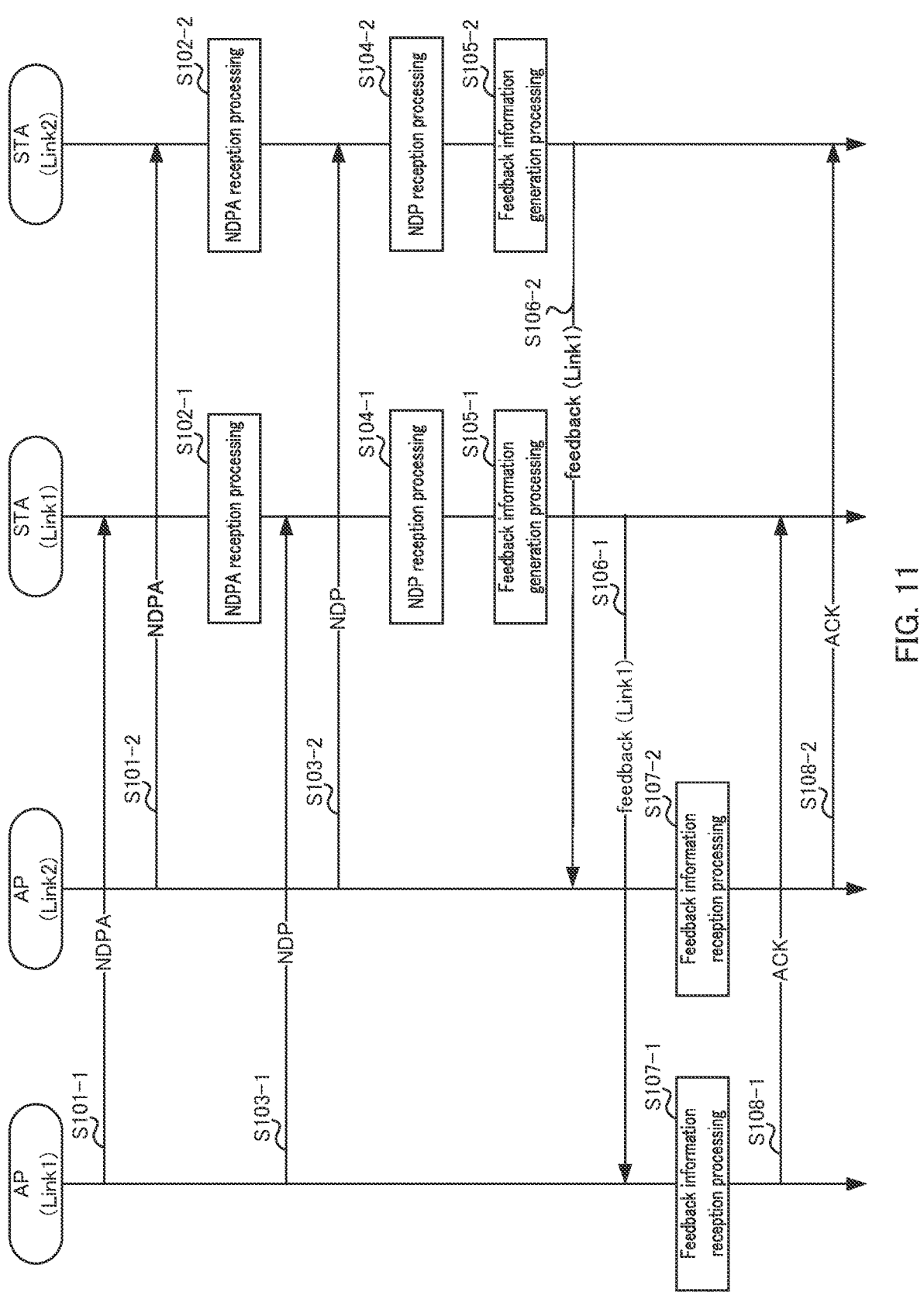
FIG. 11 is a sequence diagram illustrating an exemplary operation of a radio communication system according to Embodiment 1.

FIG. 11 is a sequence diagram illustrating an exemplary operation of the radio communication system, relating to the multi-link feedback transmission.

In FIG. 11, as an example, a description will be given of an exemplary operation relating to transmission of feedback information between AP 100 having two links (e.g., link 1 and link 2) and STA 200 having two links (e.g., link 1 and link 2). The number of links to be used in transmitting the feedback information may be "one" or more, and, in the multi-link feedback, the number is not limited to "two" and may be "three" or more.

In FIG. 11, AP 100 may transmit, to STA 200, an NDPA including control information on multi-link feedback transmission, via each link (e.g., link 1 and link 2), for example (S101-1 and S101-2). STA 200 may perform reception processing on the NDPA received via each link and acquire (or receive) the control information on the multi-link feedback, for example (S102-1 and S102-2). The transmission of the NDPA may indicate, to STA 200, that an NDP is transmitted after the NDPA (e.g., following NDPA).

AP 100 may transmit an NDP to STA 200, for example (S103-1 and S103-2). STA 200 may perform reception processing on the NDP based on the control information acquired from the NDPA, for example (S104-1 and S104-2). For example, STA 200 may perform channel estimation based on a reference signal (e.g., LTF) included in a preamble unit of the received NDP.

In FIG. 11, as an example, STA 200 may use the reference signal (e.g., LTF) included in the Preamble unit of the NDP transmitted via link 1 to perform channel estimation for link 1.

STA 200 may generate feedback information, for example (S105-1 and S105-2). For example, STA 200 may generate one or more pieces of feedback information of the HE compressed Beamforming Report, the HE MU Exclusive Beamforming Report, and the HE CQI Report, based on a channel estimation value acquired by the channel estimation and a feedback type indicated in the control information of the NDPA.

STA 200 may, for example, determine the link to be used in transmitting the feedback information (e.g., multi-link feedback transmission), based on the control information included in the NDPA, and transmit the feedback information to AP 100 in the determined link (S106-1 and S106-2). In FIG. 11, by way of example, STA 200 may transmit the feedback information related to link 1 to AP 100 using link 1 and link 2.

AP 100 may, for example, receive the feedback information transmitted via each link from STA 200 (S107-1 and S107-2). AP 100 may, for example, perform re-configuration of the feedback information distributed to each link, based on the control information related to the multi-link feedback included in the NDPA or the control information included in the feedback information.

AP 100 may, for example, transmit an ACK signal to STA 200 via each link in accordance with a reception processing result on the feedback information (S108-1 and S108-2).

In FIG. 11, a case has been described where the NDPA and the NDP are transmitted in both of link 1 and link 2, but the present disclosure is not limited to this case, and the NDPA and the NDP may be transmitted in at least one of the plurality of links. Additionally, in FIG. 11, a case has been described where the feedback information related to link 1 is generated, but the present disclosure is not limited to this case, and feedback information related to at least one of the plurality of links may be generated. Further, in FIG. 11, a case has been described where the feedback information is transmitted in both of link 1 and link 2, but the present disclosure is not limited to this case, and the feedback information may be transmitted in at least one of the plurality of links.

An exemplary operation of the radio communication system related to the multi-link feedback transmission has been described, thus far.

Next, a description will be given of an exemplary control method for the multi-link feedback transmission (Control Method 1 and Control Method 2).

[Control Method 1]

In Control Method 1, control information on the multi-link feedback transmission may include, for example, identification information on a link that can be used for the multi-link transmission (e.g., referred to as a "link identifier" or a "Link ID"). STA 200 may determine, in Multi-Link, a link to be used in transmitting the feedback information, based on the identification information to be indicated, for example.

For example, the Link ID may be a bitmap corresponding to each link using one bit (e.g., referred to as a "Link ID bitmap"). For example, a link of Link ID bitmap=1 may be configured as a link used for the feedback transmission, and a link of Link ID bitmap=0 may be configured as a link not used for the feedback transmission. Note that, the Link ID is not limited to information in the form of a bitmap and may be information in other forms.

The Link ID may be configured (e.g., indicated) for STA 200 by AP 100 when STA 200 is connected to AP 100, for example.

Meanwhile, a field length of the Link ID bitmap may be, for example, a fixed length or a variable length.

Figure 12:
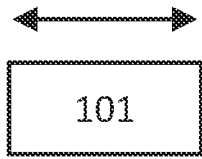
FIG. 12 illustrates an exemplary Link ID bitmap.

For example, as illustrated in FIG. 12, a field-length of a Link ID bitmap may be set to the maximum number of links that is previously specified (e.g., specified by standards). In other words, the amount of Link ID bitmap may be based on the previously specified number of links. In this case, the field-length of the Link ID bitmap is fixed.

Figure 13:
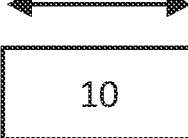
FIG. 13 illustrates another exemplary Link ID bitmap.

Meanwhile, for example, as illustrated in FIG. 13, a field length of a Link ID bitmap may be set to the maximum number of links of AP 100. In other words, the information amount of Link ID bitmap may be based on the number of links configured for AP 100. In this case, the field-length of the Link ID bitmap is variable. For example, when STA 200 is connected to AP 100, the maximum number of links on the basis of capability information of AP 100 may be indicated, together with the Link ID, to STA 200.

By way of example, in a case where the field length of the Link ID bitmap is set to the maximum number of links of AP 100, the Link ID bitmap is indicated with a shorter field length as compared to a case where the field length of the Link ID bitmap is set to the maximum number of links specified by standards; thus, signaling overhead can be reduced.

Further, for example, after receiving the control information including the Link ID bitmap, STA 200 may determine the link to which transmission of the feedback information is assigned in the multi-link transmission (i.e., distribution of feedback information (hereinafter may also be referred to as "feedback information distribution")), based on the Link ID bitmap and a specified rule.

For example, the specified rule may be based on the number of spatial streams included in the feedback information (e.g., the number of spatial streams in which reception quality is measured (or estimated)) and the bandwidth of each link used in transmitting the feedback information. As an example, it is assumed that the number of spatial streams included in the feedback information is N, the number of links used for the multi-link feedback and indicated by the Link ID bitmap is two (e.g., link 1 and link 2), the bandwidth of link 1 is BW1, and the bandwidth of link 2 is BW2. In this case, STA 200 may transmit feedback information of (N*BW1)/((BW1+BW2) via link 1 and (N*BW2)/((BW1+BW2) via link 2.

Meanwhile, for example, the specified rule may be based on a type (or kind) of feedback information. In one example, when the number of links used for the multi-link feedback and indicated to STA 200 by the Link ID bitmap is two (e.g., link 1 and link 2), STA 200 may transmit the mean SNR for each spatial stream included in the HE MU Compressed Beamforming Report via link 1 and transmit the feedback matrix included in the HE MU Compressed Beamforming Report via link 2.

Incidentally, the type of feedback information transmitted via each link may be determined based on, for example, the frequency band of each link. By way of example, feedback information with a larger information amount may be associated with a link with a higher frequency band among the plurality of links.

Alternatively, for example, feedback information with a higher priority (or importance) may be associated with a link with a higher frequency band among the plurality of links.

Thus, indication of the Link ID bitmap to STA 200 from AP 100 allows STA 200 to perform the multi-link feedback transmission.

Next, descriptions will be given of Example 1 to Example 4 of the Link ID bitmap indication and the feedback information transmission in Control Method 1.

Example 1

In Example 1, STA 200 may determine to use a link that is different from a link in which the control information (e.g., NDPA and NDP) has been received, in transmitting the feedback information in the multi-link transmission.

Figure 14:
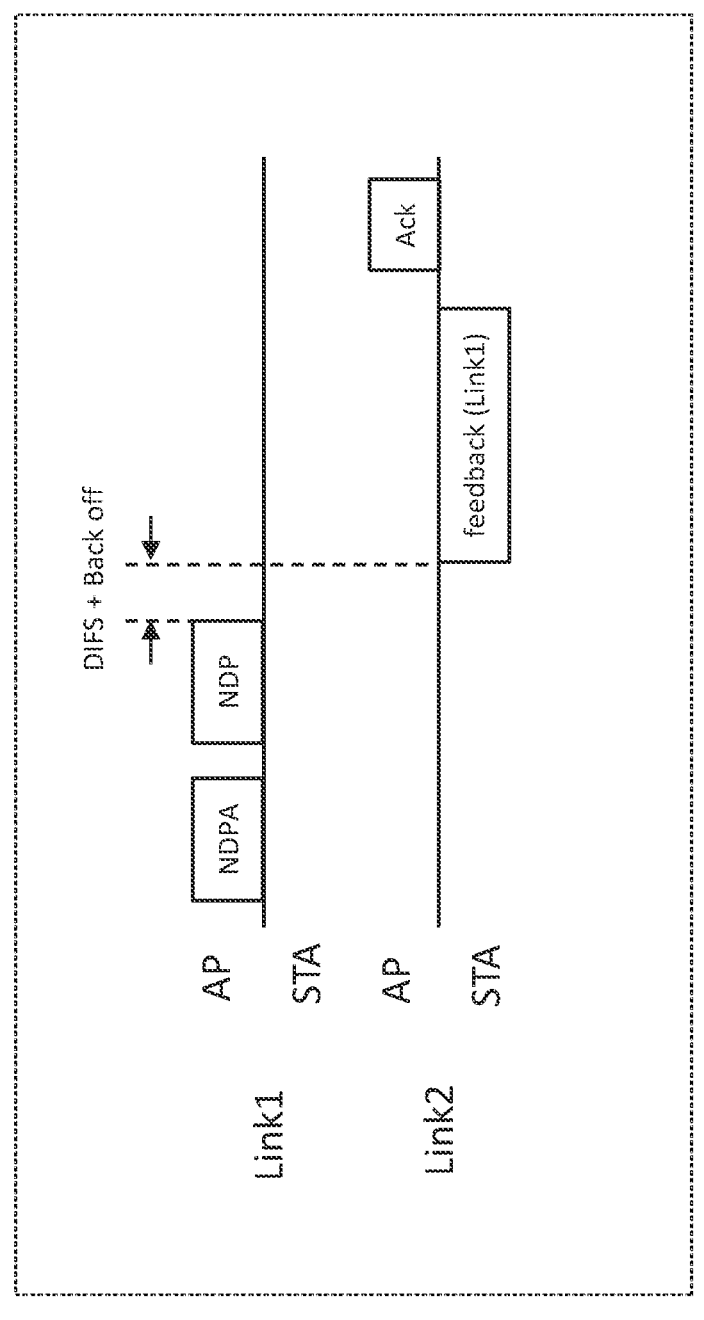
FIG. 14 is a sequence diagram illustrating an exemplary operation of transmitting feedback information.

FIG. 14 is a sequence diagram illustrating an exemplary operation of transmitting control information and feedback information in Example 1.

In FIG. 14, for example, AP 100 transmits an NDPA and an NDP to STA 200 via link 1. For example, in the Link ID bitmap included in the NDPA, link 1 may be configured as a link not used for the feedback transmission (Link ID bitmap=0), and link 2 may be configured as a link used for the feedback transmission (Link ID bitmap=1) (e.g., expressed as Link ID bitmap=[0 1]).

In FIG. 14, for example, after receiving the NDPA and the NDP, STA 200 may transmit feedback information related to link 1 (feedback (Link1)) via link 2 different from link 1 in which the Link ID bitmap has been received, based on the Link ID bitmap (=[0 1]) included in the NDPA for link 1.

Note that, via link 2 (i.e., link not used in transmitting NDPA and NDP), STA 200 may acquire a carrier sense (i.e., when channel state of link 2 is Idle) and transmit the feedback information. For example, STA 200 may transmit the feedback information after a Distributed coordination function (DCF) Inter-Frame Space (DIFS) and a back-off time.

Example 1 enables, for example, multi-link feedback with different usages for the plurality of links, respectively. By way of example, a channel in 2.4 GHz band may be used for transmitting the control information as link 1, and a channel in 5 GHz band may be used for high-speed data communication as link 2. Such a separate usage for the links improves the frequency utilization efficiency in Multi-Link.

Example 2

In Example 2, STA 200 may synchronize, between links, transmission timings of the feedback information in the multi-link transmission. For example, the feedback information may be transmitted simultaneously in the plurality of links.

Figure 15:
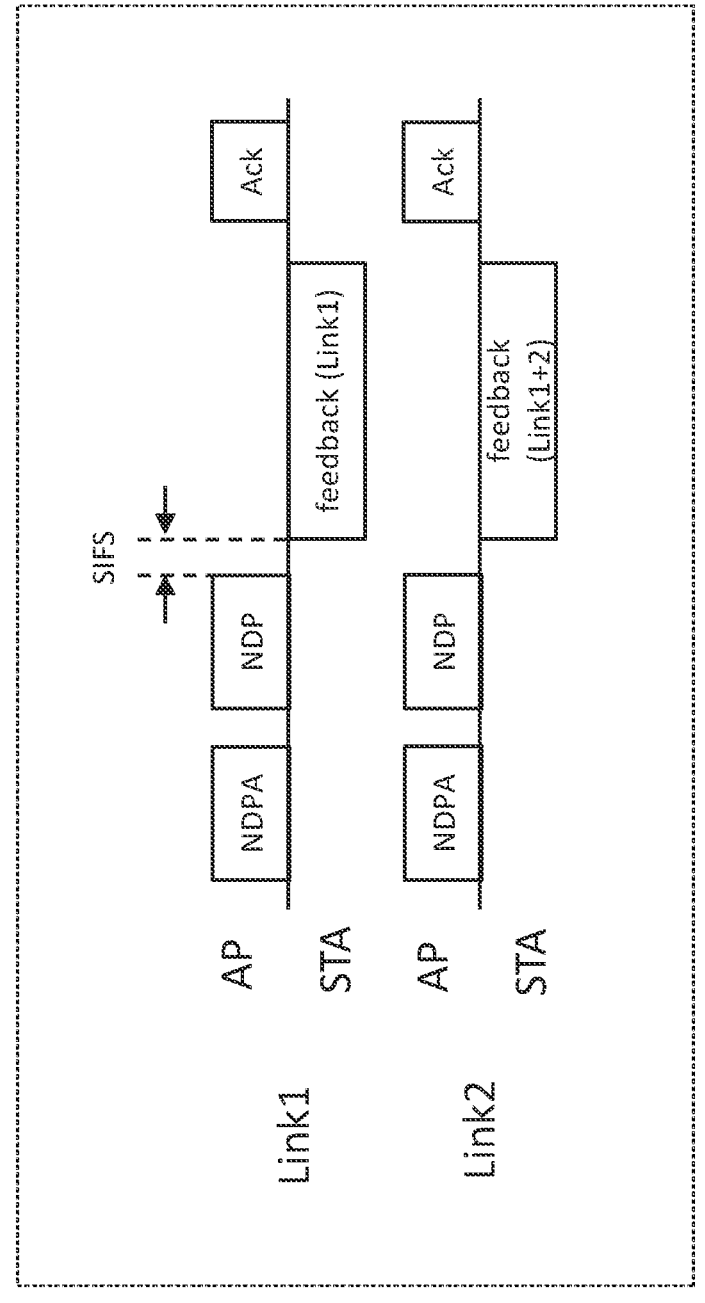
FIG. 15 is a sequence diagram illustrating another exemplary operation of transmitting feedback information.

FIG. 15 is a sequence diagram illustrating an exemplary operation of transmitting control information (e.g., NDPA and NDP) and feedback information in Example 2.

In FIG. 15, for example, AP 100 transmits NDPAs and NDPs to STA 200 via link 1 and link 2.

For example, in the Link ID bitmap included in the NDPA for link 1, link 1 may be configured as a link used for the feedback transmission (Link ID bitmap=1), and link 2 may be configured as a link used for the feedback transmission (Link ID bitmap=1) (e.g., expressed as Link ID bitmap=[1 1]). Further, for example, in the Link ID bitmap included in the NDPA for link 2, link 1 may be configured as a link not used for the feedback transmission (Link ID bitmap=0), and link 2 may be configured as a link used for the feedback transmission (Link ID bitmap=1) (e.g., expressed as Link ID bitmap=[0 1]).

In FIG. 15, for example, after receiving the NDPAs and the NDPs, STA 200 may, based on the Link ID bitmap included in the NDPA for each link, transmit feedback information related to link 1 (feedback (Link1)) via link 1 and link 2 and transmit feedback information related to link 2 (feedback (Link2)) via link 2. That is, STA 200 may simultaneously transmit the feedback information related to link 1 and link 2.

Incidentally, in FIG. 15, since STA 200 receives the NDPA and the NDP in each of link 1 and link 2, the feedback information may be transmitted after the Short Inter-Frame Space (SIFS) of the NDP. That is, STA 200 may transmit the feedback information without acquiring a carrier sense via each link.

According to Example 2, for example, the feedback information may be distributed to the plurality of links based on the communication capacity of each link. By way of example, when the communication capacity of link 2 is greater than that of link 1 in the multi-link feedback, STA 200 may transmit a portion of the feedback information of link 1 via link 2. Such feedback information transmission improves the frequency utilization efficiency in the multi-link and reduces feedback overhead.

Example 3

In Example 3, STA 200 may make different, between links, transmission timings of the feedback information in the multi-link transmission.

Figure 16:
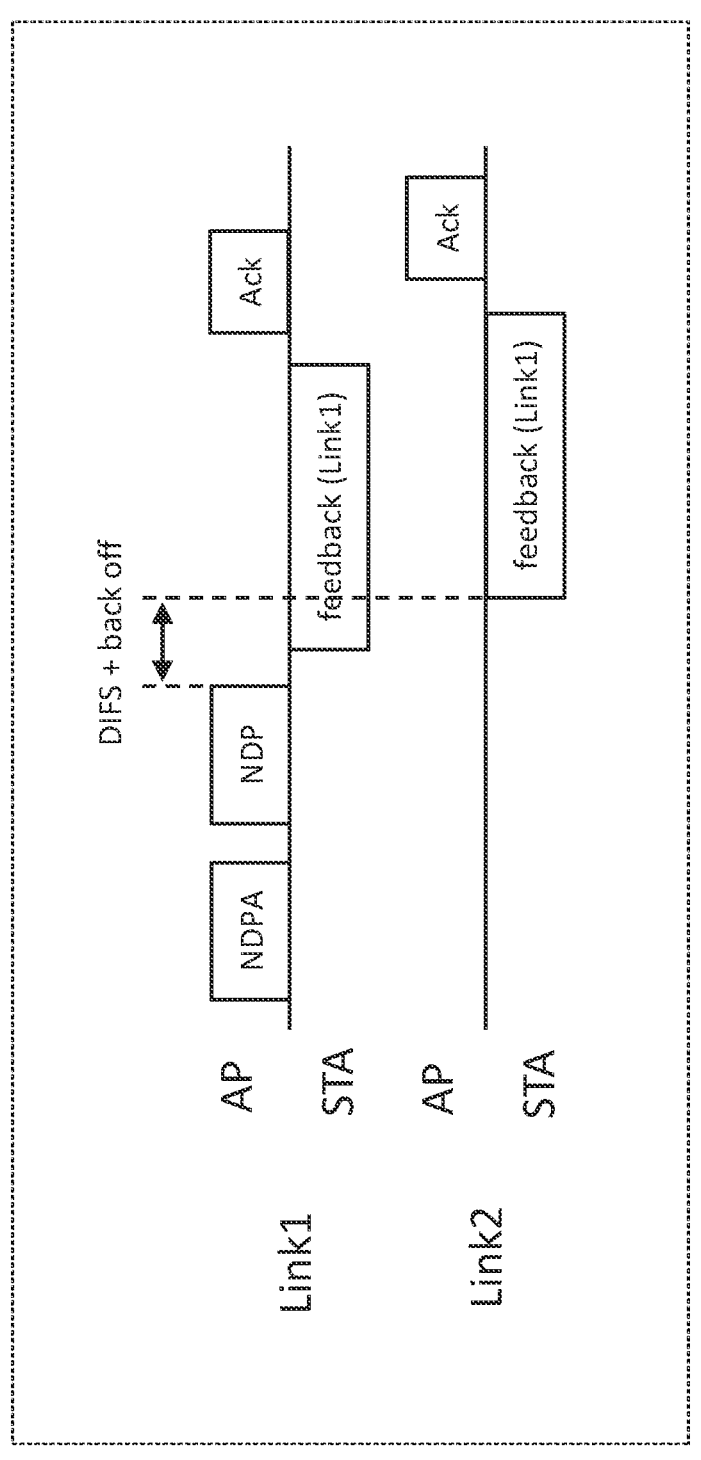
FIG. 16 is a sequence diagram illustrating still another exemplary operation of transmitting feedback information.

FIG. 16 is a sequence diagram illustrating an exemplary operation of transmitting control information (e.g., NDPA and NDP) and feedback information in Example 3.

In FIG. 16, for example, AP 100 transmits an NDPA and an NDP to STA 200 via link 1. For example, in the Link ID bitmap included in the NDPA for link 1, link 1 may be configured as a link used for the feedback transmission (Link ID bitmap=1), and link 2 may be configured as a link used for the feedback transmission (Link ID bitmap=1) (e.g., expressed as Link ID bitmap=[1 1]).

In FIG. 16, for example, after receiving the NDPA and the NDP, STA 200 may transmit feedback information related to link 1 (feedback (Link1)) in each of link 1 and link 2, based on the Link ID bitmap (=[1, 1]) included in the NDPA for link 1.

In FIG. 16, since STA 200 receives the NDPA and the NDP via link 1, the feedback information may be transmitted after the SIFS of receiving the NDP via link 1. On the other hand, via link 2 (i.e., link not used in transmitting NDPA and NDP), STA 200 may acquire a carrier sense (i.e., when channel state of link 2 is Idle) and transmit the feedback information. Therefore, as illustrated in FIG. 16, for example, STA 200 may transmit the feedback information at different timings in a plurality of links (e.g., link 1 and link 2).

At this time, as illustrated in FIG. 16, since the timing at which STA 200 receives an ACK signal from AP 100 via link 1 and the timing at which STA 200 transmits the feedback information via link 2 may overlap, STA 200 may be an STR non-AP MLD.

In FIG. 16, since the feedback transmission via link 2 is delayed as compared to that via link 1, for example, link 1 may be used to transmit feedback information with a higher priority whereas link 2 may be used to transmit feedback information with a lower priority. This improves the frequency utilization efficiency in the multi-link feedback and reduces feedback overhead.

Example 4

In Example 4, STA 200 may assign, to one link (or aggregate and transmit), feedback information for each of a plurality of links in the multi-link transmission.

Figure 17:
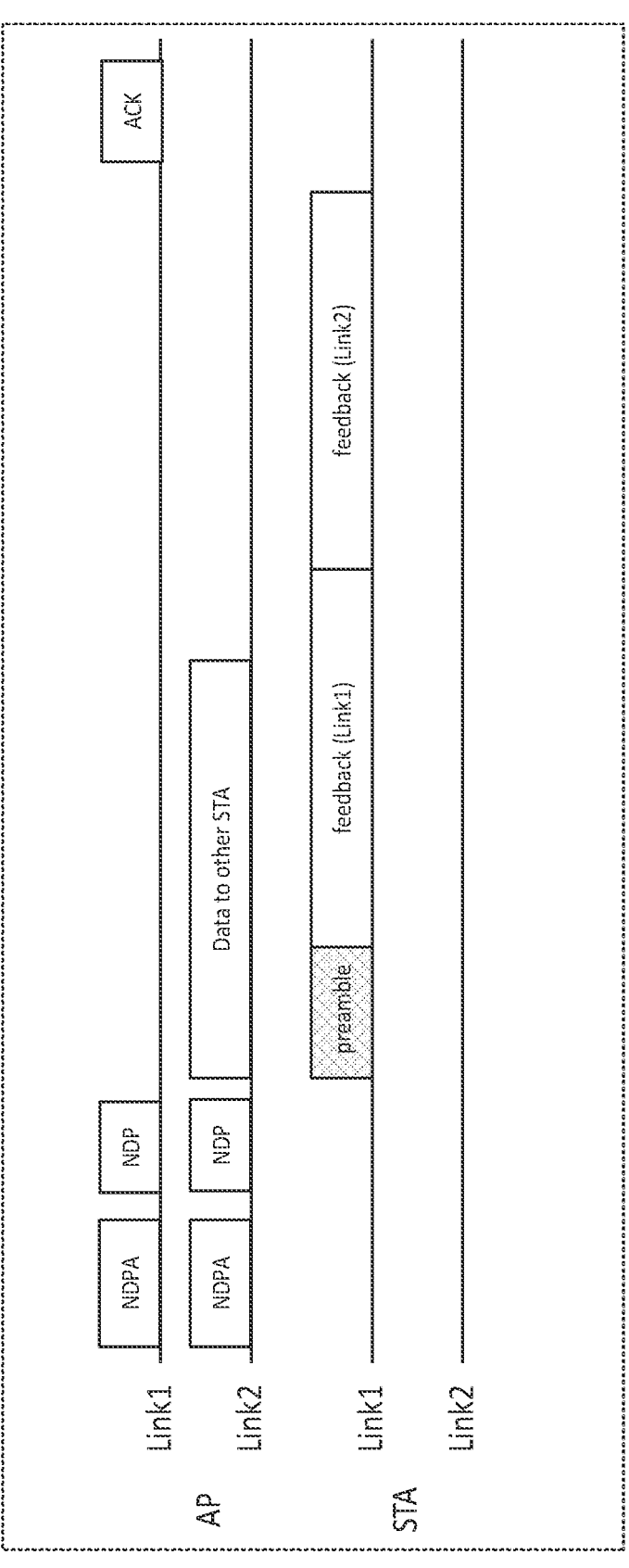
FIG. 17 is a sequence diagram illustrating a yet another exemplary operation of transmitting feedback information.

FIG. 17 is a sequence diagram illustrating an exemplary operation of transmitting control information and feedback information in Example 4.

In FIG. 17, for example, AP 100 transmits NDPAs and NDPs to STA 200 via link 1 and link 2. For example, in Link ID bitmaps included in the NDPAs for respective link 1 and link 2, link 1 may be configured as a link used for the feedback transmission (Link ID bitmap=1), and link 2 may be configured as a link not used for the feedback transmission (Link ID bitmap=0) (e.g., expressed as Link ID bitmap=[1 0]).

In FIG. 17, for example, after receiving the NDPAs and the NDPs, STA 200 may transmit feedback information related to link 1 (feedback (Link1)) and feedback information related to link 2 (feedback (Link2)) via link 1, based on the Link ID bitmaps (=[1 0]) for link 1 and link 2. In other words, STA 200 may aggregate the feedback information for each of link 1 and link 2 into link 1 and transmit the feedback information.

For example, when having an Association ID (AID) common to the respective links, STA 200 may aggregate feedback information for the plurality of links with an Aggregation MAC Service Data Unit (A-MSDU).

Further, for example, while STA 200 transmits the feedback information, AP 100 may transmit packets for other STAs 200 in a link (link 2 in FIG. 17) that becomes available by STA 200 aggregating feedback information into one link.

According to Example 4, frequency resources of other links can be released by aggregating the feedback information into one link, for example. In addition, for example, AP 100 can transmit packets to other STAs in the released frequency-resources, which improves the frequency utilization efficiency. Further, aggregating the feedback information into one link reduces overhead of a preamble, for example.

In Example 4, a case has been described where the feedback information is aggregated into one link of the plurality of links, but the present disclosure is not limited to this case, and the feedback information for the plurality of links may be assigned to some links of the plurality of links (e.g., two or more links).

Example 1 to Example 4 of indication of a Link ID bitmap and transmission of feedback information in Control Method 1 have been each described, thus far.

In Control Method 1, AP 100 indicates, to STA 200, control information on the multi-link transmission (e.g., Link ID bitmap), for example. STA 200 then controls the multi-link transmission based on the indicated control information (e.g., Link ID bitmap), for example (e.g., determines link to transmit feedback information).

This control makes it possible to improve the transmission efficiency in Multi-Link, for example. For example, STA 200 can determine a link to transmit the feedback information based on the state of each link or the characteristic of each link.

[Control Method 2]

In Control Method 2, control information on the multi-link feedback transmission may include, information on distribution of feedback information for a plurality of links in the multi-link transmission. STA 200 may determine the distribution of the feedback information between the links in the multi-link transmission, based on the information on the distribution of the feedback information to be indicated, for example.

For example, a method for distributing the feedback information may be a method based on a parameter such as a spatial stream, a channel index (or frequency band), or a feedback information type.

<Case 1>

For example, AP 100 and STA 200 may determine the distribution of the feedback information based on the spatial stream.

In this case, the control information on the multi-link feedback transmission may include, for example, information on a spatial stream included in the feedback information transmitted via each link. For example, as illustrated in FIG. 18, AP 100 may indicate, to STA 200, an index of a start point (e.g., Feedback SS start index) and an index of an end point (e.g., Feedback SS end index) of the spatial stream included in the feedback information transmitted via each link.

By way of example, in 11be, the Feedback SS start index and the Feedback SS end index may each be set to a 4-bit field to support up to 16 spatial streams. The maximum number of spatial streams to be supported is not limited to 16, and the number of bits of control information on the multi-link feedback transmission may be set according to the number of spatial streams to be supported.

<Case 2>

For example, AP 100 and STA 200 may determine the distribution of the feedback information based on the channel index (frequency band).

In this case, the control information on the multi-link feedback transmission may include, for example, information on a frequency band (e.g., channel) included in the feedback information transmitted via each link. For example, as illustrated in FIG. 19, AP 100 may indicate, to STA 200, an index of a start point (e.g., Channel start index) and an index of an end point (e.g., Channel end index) of the channel (e.g., channel in 20 MHz unit) included in the feedback information transmitted via each link.

By way of example, the channel index may be assigned in ascending order from 20 MHz, which is a low level. Further, for example, in 11be, the Channel start index and the Channel end index may each be set to a 4-bit field to support up to 320 MHz (20 MHz*16). The maximum frequency band to be supported is not limited to 320 MHz, and the number of bits of control information on the multi-link feedback transmission may be set according to the frequency band to be supported. The channel index may be assigned not only in ascending order from the lower channel, but also in descending order or in accordance with other rules.

<Case 3>

For example, AP 100 and STA 200 may determine the distribution of the feedback information based on the feedback information type.

In this case, the control information on the multi-link feedback transmission may include, for example, information on a feedback information type transmitted via each link.

For example, as illustrated in FIG. 20, AP 100 may indicate, to STA 200, information indicating the feedback information type (e.g., Feedback info type bit) transmitted via each link.

Exemplary distribution methods of the feedback information have been each described, thus far.

In Control Method 2, AP 100 indicates, to STA 200, control information on the multi-link transmission (e.g., information on distribution of feedback information), for example. STA 200 then controls the multi-link transmission based on the indicated information on the distribution of the feedback information (e.g., determines distribution of feedback information).

This processing makes it possible to improve the transmission efficiency in Multi-Link, for example. For example, STA 200 can appropriately distribute the feedback information between the plurality of links based on the state of each link.

Incidentally, the distribution of the feedback information is not limited to the parameters mentioned above and may be based on another parameter corresponding to the state of each link, for example.

Next, an exemplary distribution method of the feedback information in Control Method 2 (Method 2-1 and Method 2-2) will be described.

[Method 2-1]

In Method 2-1, for example, AP 100 may determine the distribution method of the feedback information for each link. In other words, STA 200 may, for example, receive control information on distribution of feedback information from AP 100 and determine the distribution of the feedback information between the links in the multi-link transmission for AP 100, based on the received control information.

AP 100 may, for example, include the control information on the feedback information distribution as illustrated in FIG. 21 in user information of a feedback-request signal and indicate the information to STA 200. An example of the feedback-request signals includes, for example, an NDPA or a Trigger frame.

The "Feedback transmit link ID bitmap" illustrated in FIG. 21 may be, for example, information indicating an identifier of a link used in the feedback transmission. In one example, when the number of links used in transmitting the feedback information is two, the Feedback transmit link ID bitmap may be represented in two bits, and '10' indicates link 1, '01' indicates link 2, and '11' may indicate link 1 and link 2.

Further, the "Feedback info link ID bitmap" illustrated in FIG. 21 may be, for example, information indicating an identifier of a link included in the feedback information (e.g., link in which reception quality is measured (or estimated)). In one example, when the number of links used in transmitting the feedback information is two, the Feedback info link ID bitmap may be represented in two bits, and '10' indicates link 1, '01' indicates link 2, and '11' may indicate link 1 and link 2.

Further, the "Feedback SS start index" and the "Feedback SS end index" illustrated in FIG. 21 may be, for example, information on the distribution of the feedback information. Incidentally, FIG. 21 illustrates the distribution method based on the spatial stream (e.g., FIG. 18), but the information on the distribution of the feedback information is not limited to this and may be the above-mentioned distribution method based on the channel index (e.g., FIG. 19) or the feedback information type (e.g., FIG. 20).

Byway of example, when the multi-link feedback transmission as illustrated in FIG. 15 is performed, AP 100 may include control information on the multi-link feedback as illustrated in FIG. 22 in the NDPA for each link (link 1 and link 2 in example of FIG. 15) and indicate the information to STA 200.

For example, in FIG. 22, AP 100 may use, in the user information of link 1, link 1 (e.g., Feedback transmit link ID bitmap=10) to indicate, to STA 200, transmission of the feedback information related to spatial stream indices 1 to 4 of link 1 (e.g., Feedback info Link ID bitmap=10, Feedback SS start index=1, and Feedback SS end index=4).

Meanwhile, for example, in FIG. 22, AP 100 may use, in the user information of link 2, link 2 (e.g., Feedback transmit link ID bitmap=01) to indicate, to STA 200, transmission of the feedback information related to spatial stream indices 5 to 8 of link 1 and the feedback information related to link 2 (e.g., Feedback info Link ID bitmap=11, Feedback SS start index=5, and Feedback SS end index=8).

STA 200 may, for example, distribute the feedback information based on the control information included in the user information received in each of link 1 and link 2 and thereby perform the feedback transmission.

Additionally, AP 100 may re-configure the feedback information transmitted from STA 200, based on the distribution method of the feedback information, for example. By way of example, in FIG. 22, AP 100 may re-configure the feedback information related to spatial streams 1 to 8 of link 1, based on the feedback information related to spatial stream indices 1 to 4 of link 1 received via link 1 and the feedback information related to spatial stream indices 5 to 8 of link 1 received via link 2.

According to Method 2-1, for example, AP 100 can control the distribution of the feedback information for each link based on use information (e.g., NAV status information) for each link of STA 200, which improves the frequency utilization efficiency.

Next, descriptions will be given of Examples 1 and 2 of the control information indication and the feedback information transmission in Method 2-1.

Example 1

In Example 1, AP 100 may include control information on the feedback information for each link in a Trigger frame and transmit the information to STA 200, for example.

AP 100 may include the control information on the feedback information in a User Info field of the Trigger frame when controlling (i.e., requesting) the multi-link feedback for a plurality of STAs 200, for example.

Figure 23:
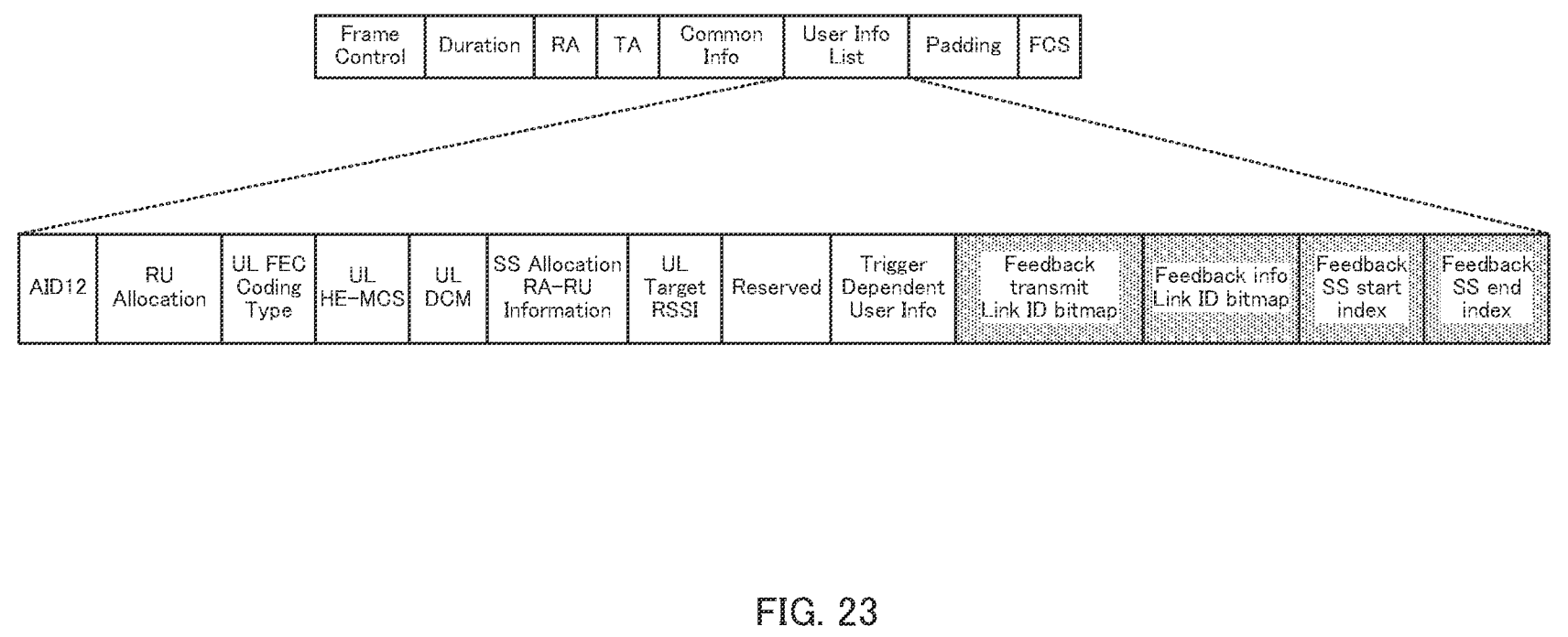

For example, as illustrated in FIG. 23, the control information on the feedback information may be included in User info of a Beamforming Report Poll (BFRP) of a Trigger frame.

Figure 24:
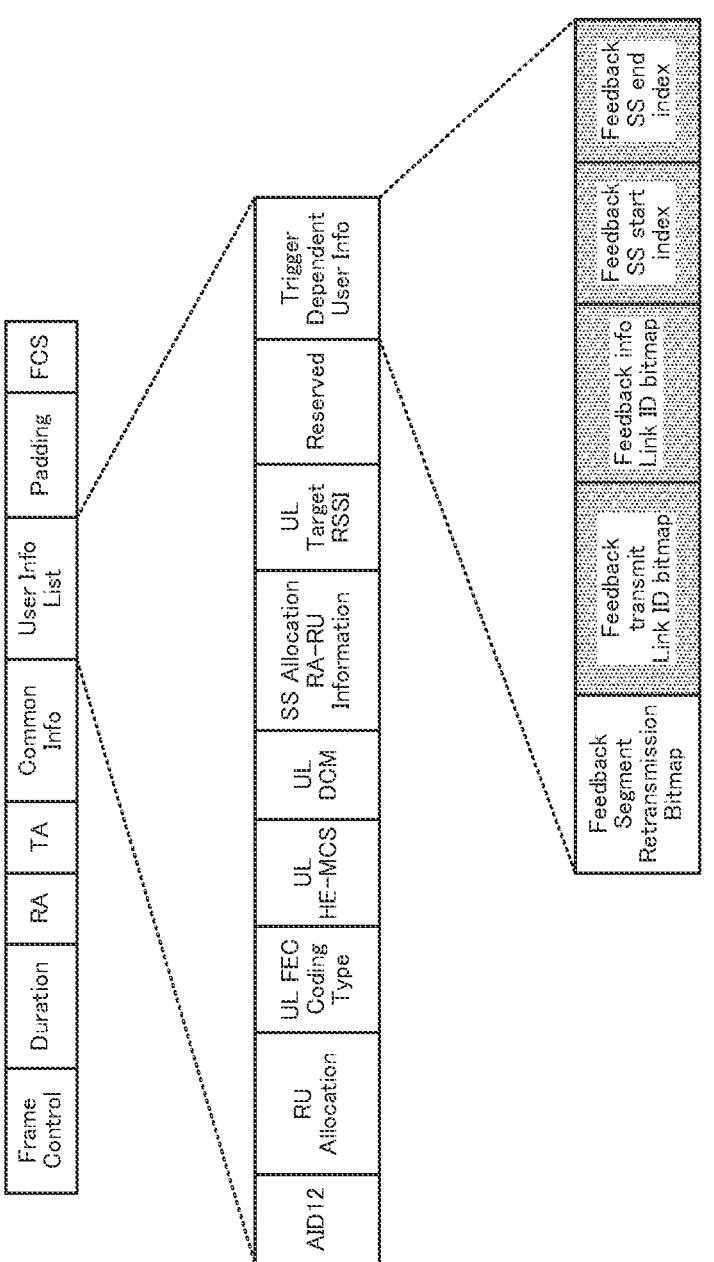
FIG. 24 illustrates another exemplary Trigger frame.

Alternatively, for example, as illustrated in FIG. 24, the control information on the feedback information may be included in, for example, Trigger dependent user info of a Trigger frame (e.g., BFRP).

Next, an exemplary operation will be described in a case where AP 100 indicates a multi-link feedback to a plurality of STAs 200 in Example 1.

Figure 25:
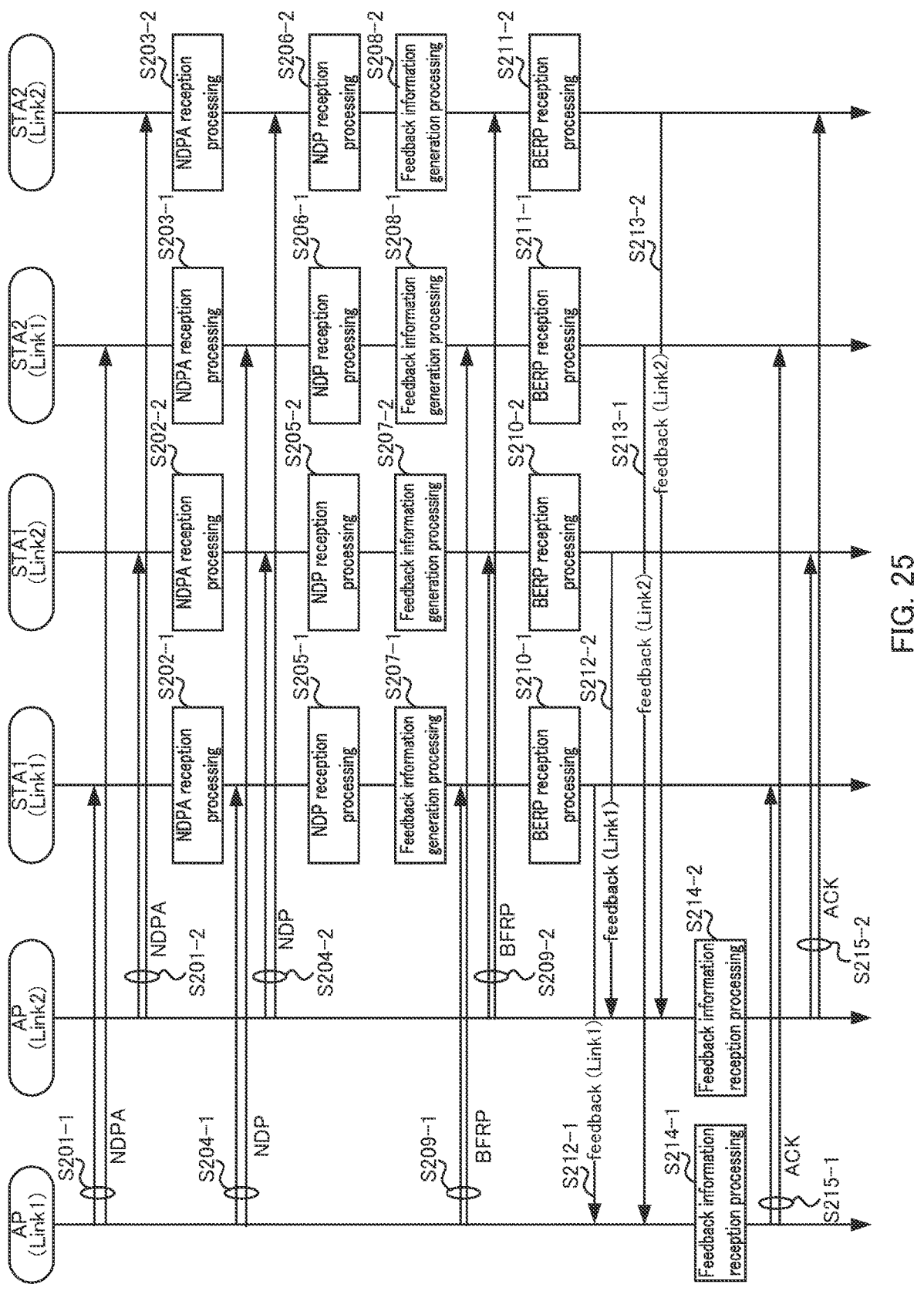
FIG. 25 is a sequence diagram illustrating an exemplary operation of a radio communication system according to Embodiment 2.

FIG. 25 is a sequence diagram illustrating an exemplary operation in a case where AP 100 controls the multi-link feedback for the plurality of STAs 200.

In FIG. 25, as an example, a description will be given of an exemplary operation in AP 100 (e.g., AP) having two links (e.g., link 1 and link 2) and two STAs 200 each having two links (e.g., STA 1 and STA 2). Note that, the number of links used in the multi-link feedback may be "two" or more as mentioned above.

In FIG. 25, the AP transmits, to each STA, an NDPA and an NDP in at least one of link 1 and link 2 (e.g., S201-1, S201-2, S204-1, and S204-2).

STA 1 and STA 2, for example, perform reception processing on the NDPA in each of link 1 and link 2 and acquire control information for receiving the NDP (e.g., S202-1, S202-2, S203-1, and S203-2).

STA 1 and STA 2 also perform reception processing on the NDP, for example, (e.g., S205-1, S205-2, S206-1, and, S206-2). Further, STA 1 and STA 2 generate feedback information (e.g., HE compressed Beamforming Report and HE MU Exclusive Beamforming Report) indicated in, for example, channel estimation values and the control information acquired from the NDPAs (e.g., S207-1, S207-2, S208-1, and S208-2).

The AP transmits a BFRP (e.g., Trigger frame) to STA 1 and STA 2, for example (e.g., S209-1 and S209-2). The BFRP may include, for example, control information on the multi-link feedback transmission. The BFRP may also include, for example, frequency-resource allocation information for performing frequency-multiplexing (e.g., also referred to as OFDMA: Orthogonal Frequency-Division Multiple Accuses) in each link.

STA 1 and STA 2 perform reception processing on the BFRP and acquires the control information on the multi-link feedback transmission and the frequency-resource allocation information (e.g., S210-1, S210-2, S211-1, and S211-2).

STA 1 and STA 2 may transmit feedback information to the AP based on the control information indicated by the BFRP, for example (e.g., S212-1, S212-2, S213-1, and S213-2). In one example, STA 1 and STA 2 may transmit the feedback information using UL OFDMA to the AP, using allocated frequency-resources. Further, for example, STA 1 and STA 2 may distribute the feedback information to link 1 and link 2 in accordance with the control information on the multi-link feedback. In the example illustrated in FIG. 25, STA 1 distributes, to link 1 and link 2, the feedback information corresponding to link 1 and transmits the information. Further, in the example illustrated in FIG. 25, STA 2 distributes, to link 1 and link 2, the feedback information corresponding to link 2 and transmits the information.

The AP may perform reception processing on the feedback information transmitted from each of STA 1 and STA 2, for example (e.g., S214-1 and S214-2). The AP may perform re-configuration of the feedback information for each STA that has been received in the plurality of links, based on the control information indicated to each STA, for example.

In addition, the AP transmits, to STA 1 and STA 2, an ACK signal via each link, based on the reception processing results on the feedback information, for example (e.g., S215-1 and S215-2).

Thus, according to Example 1, AP 100 can indicate the control information on the multi-link feedback to a plurality of STAs 200 at once, for example. In addition, for example, when the control information is included in the Trigger dependent User Info of the BFRP, it is not required to add signaling for the multi-link feedback to User Info of a Trigger frame that is different from the BFRP, which reduces feedback overhead.

Example 2

In Example 2, AP 100 may include control information on feedback information for each link in an NDPA and transmit it to STA 200, for example.

Figure 26:
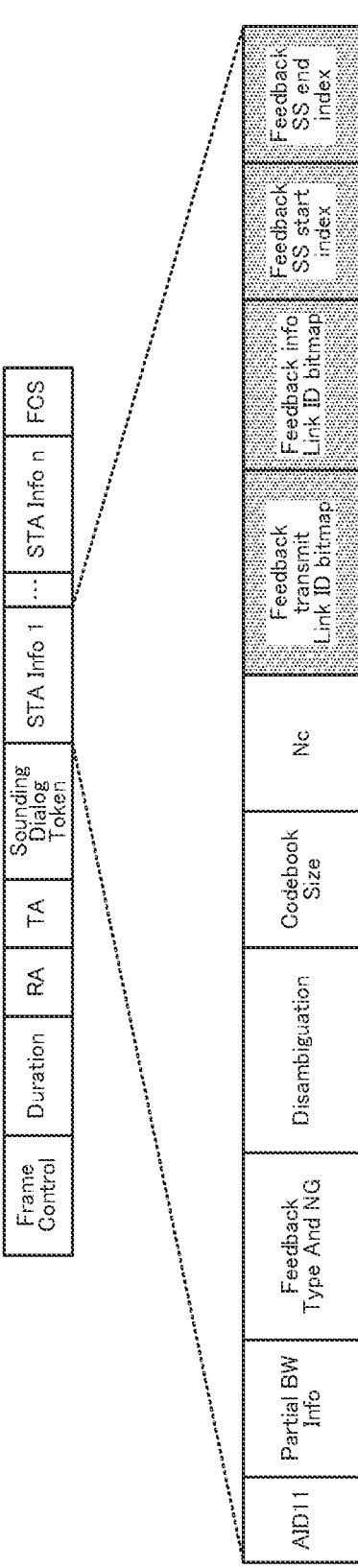
FIG. 26 illustrates an exemplary NDP Announcement (NDPA)

AP 100 may include the control information on the feedback information in STA Info of the NDPA, as illustrated in FIG. 26, when controlling (i.e., requesting) the multi-link feedback for single STA 200, for example.

Example 2 allows AP 100 to indicate, to single STA 200, the control information on the multi-link feedback without a Trigger frame (e.g., BFRP), for example.

Incidentally, AP 100 may include control information on multi-link feedback addressed to a plurality of STAs in the NDPA. In this case, AP 100 may indicate, to each STA 200, a transmission timing of the feedback information, in the BFRP, for example.

[Method 2-2]

In Method 2-2, for example, STA 200 may determine the distribution method of the feedback information for each link. In other words, STA 200 may determine the distribution of feedback information to a plurality of links and transmit, to AP 100, control information on the determined distribution of the feedback information, for example.

Figure 27:
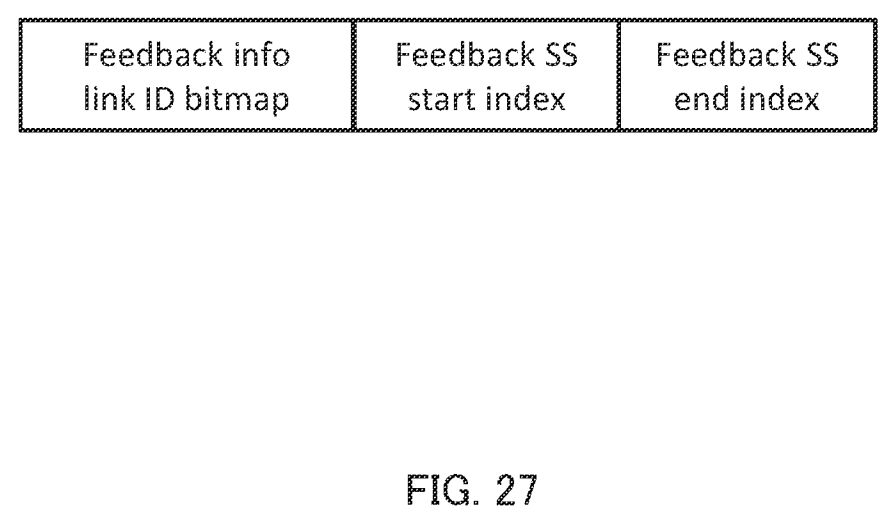

STA 200 may, for example, include the control information on the feedback information distribution as illustrated in FIG. 27 in the feedback information and indicate the information to AP 100. In FIG. 27, for example, the "Feedback info link ID bitmap" may be information indicating an identifier of a link included in the feedback information (e.g., link in which reception quality is measured (or estimated)). Further, the "Feedback SS start index" and the "Feedback SS end index" illustrated in FIG. 27 may be, for example, information on the distribution of the feedback information. Incidentally, FIG. 27 illustrates the distribution method based on the spatial stream, but the information on the distribution of the feedback information is not limited to this and may be the above-mentioned distribution method based on the channel index (e.g., FIG. 19) or the feedback information type (e.g., FIG. 20).

Figure 28:
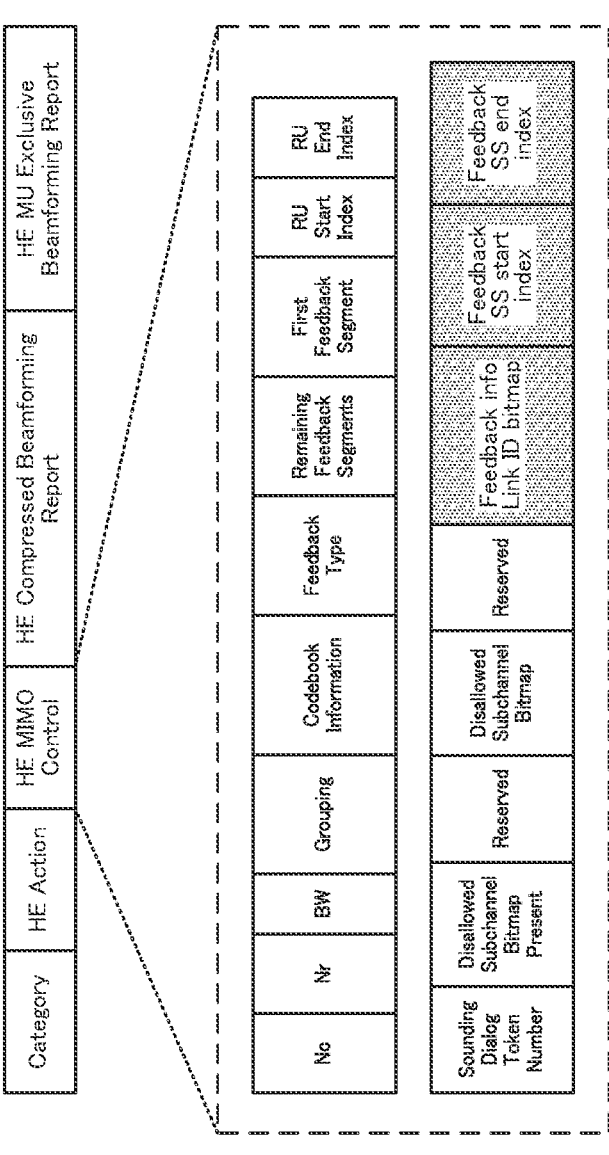
FIG. 28 illustrates an example of HE MIMO Control.

For example, as illustrated in FIG. 28, the control information on the distribution of the feedback information may be included in a HE MIMO Control field of a Compressed Beamforming/CQI frame Action field format. Note that, the control information on the distribution of the feedback information is not limited to the HE MIMO Control field and may be indicated to AP 100 in another field.

As an example, when the multi-link feedback transmission as illustrated in FIG. 15 is performed, STA 200 may indicate, to AP 100, that feedback information for spatial stream indices 1 to 4 of link 1 is included, in the feedback information for link 1. In addition, STA 200 may indicate, to AP 100, that feedback information for spatial stream indices 5 to 8 of link 1 and feedback information for link 2 are included, in the feedback information for link 2.

Incidentally, for example, when the feedback information for a plurality of links is transmitted via one link as link 2 illustrated in FIG. 15, in one HE MIMO Control field, a parameter of feedback information common to the plurality of links (e.g., information different from control information on multi-link feedback, such as "Nc" and "Nr" in FIG. 28) may be indicated, or a HE MIMO Control fields different for each link may be configured, and a parameter of feedback information separate for each link may be applied.

Method 2-2 allows STA 200 to, for example, autonomously control the distribution method of the feedback information for each link, based on a use status of this STA 200 for each link, which improves the frequency utilization efficiency.

In the distribution method of the feedback information described in Control Method 2, the feedback information may be distributed to each link, based on a subcarrier index or a frequency resource unit index, for example.

Further, in Control Method 2, an example has been described in which a BFRP is used as a type of Trigger frame when the control information on the feedback information transmission is indicated to STA 200 by the Trigger frame, but the control information on the multilink feedback may be indicated, to STA 200, by a Trigger frame type different from the BFRP.

Control Method 1 and Control Method 2 have been each described, thus far.

Incidentally, Control Method 1 (indication of Link ID) and Control Method 2 (indication of distribution method of feedback information) may be applied in combination or may be applied separately. By way of example, when Control Method 1 and Control Method 2 is combined, the distribution of the feedback information configured by Control Method 2 may be applied to a plurality of links used in the feedback transmission configured by Control Method 1. Further, for example, when Control Method 1 is not applied and Control Method 2 is applied, the distribution of the feedback information configured by Control Method 2 may be applied to a plurality of links configured for STA 200.

Each embodiment of the present disclosure has been described, thus far.

OTHER EMBODIMENTS

1. In Control Method 1 and Control Method 2 mentioned above, a case has been described where STA 200 performs the multi-link transmission of the feedback information including the information acquired from an NDP (e.g., reference signal included in NDP), but the feedback information may be acquired (or, generated or estimated) based on a signal different from the NDP. For example, STA 200 may transmit feedback information acquired from a reference signal included in a packet different from the NDP (e.g., referred to as "non-NDP PPDU") in Multi-Link, as in "Staggered sounding" described in NPL 3.

Figure 29:
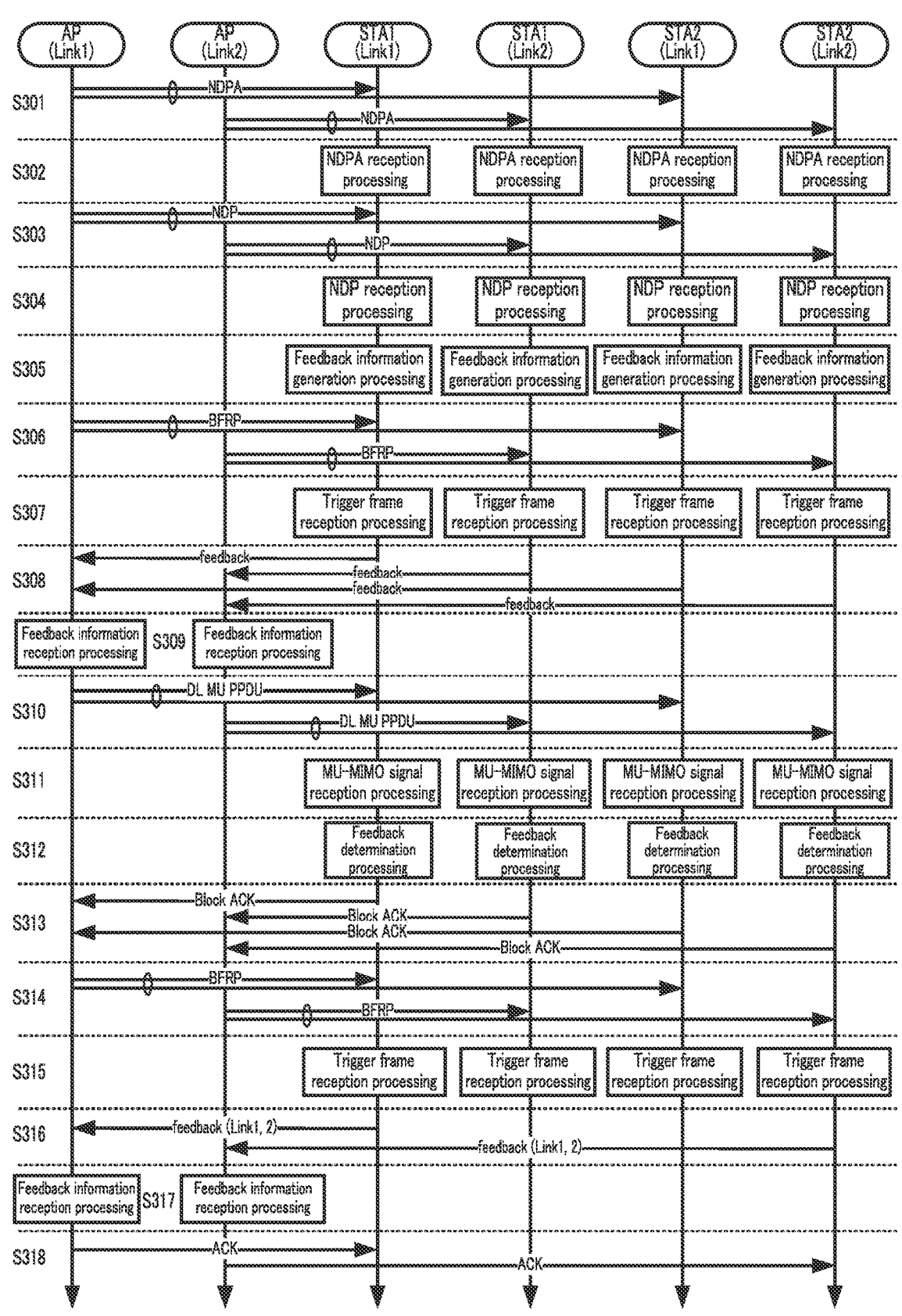
FIG. 29 is a sequence diagram illustrating an exemplary operation of a radio communication system according to another embodiment.

FIG. 29 is a sequence diagram illustrating an exemplary operation in a case where AP 100 indicates, to STA 200, multi-link transmission of feedback information acquired from the non-NDP PPDU.

In FIG. 29, as an example, a description will be given of an exemplary operation of transmitting feedback information in AP 100 (e.g., AP) having two links (e.g., link 1 and link 2) and two STAs 200 each having two links (e.g., STA 1 and STA 2). The number of links used in the multi-link feedback may be "two" or more. Further, the number of STAs to perform the multi-link transmission of feedback information acquired from a non-NDP PPDU is not limited to two and may be three or more.

In FIG. 29, the AP transmits, to STA 1 and STA 2, an NDPA including control information on feedback transmission, via link 1 and link 2, for example (S301). STA 1 and STA 2, for example, perform reception processing on the NDPA in each of link 1 and link 2 and acquire the control information on the feedback transmission (S302).

The AP transmits an NDP via link 1 and link 2, for example (S303). STA 1 and STA 2 perform reception processing on the NDP based on the control information acquired from the NDPA (S304), and generate a channel estimation value and feedback information corresponding to each of link 1 and link 2, for example (S305).

The AP, for example, transmits a Trigger frame (S306). For example, the AP may use the Trigger frame of a BFRP to indicate, to STA 1 and STA 2, the control information for UL MU transmission of the feedback information via each link (e.g., bandwidth, transmission power, assignment RU, MCS, assignment spatial stream, or the like) and a transmission timing.

STA 1 and STA 2 perform reception processing on the Trigger frame, for example (S307). STA 1 and STA 2 acquire, by receiving the Trigger frame, the control information for the UL MU-MIMO transmission of the feedback information, and transmit, to the AP, the feedback information using UL MU-MIMO (e.g., UL MU-MIMO signaling) via each of link 1 and link 2, at the transmission timing indicated by the Trigger frame, for example (S308).

The AP receives the UL MU-MIMO signal transmitted from each of STA 1 and STA 2 and acquires the feedback information (S309). The AP may perform, based on the feedback information, scheduling for performing DL MU-MIMO transmission and generate a steering matrix on for each link, for example. The AP may also perform null-control on the steering matrix in order to reduce interference between the STAs, for example.

The AP adds the steering matrix to the DL MU-MIMO signal for STA 1 and STA 2 (e.g., reference signal and data unit (DL MU PPDU) included in Preamble unit) and transmit the resultant signal, for example (S310). Meanwhile, the AP may hold the generated steering matrix in a buffer, for example.

STA 1 and STA 2 perform reception processing on the DL MU-MIMO signal (e.g., DL MU PPDU), for example (S311). For example, STA 1 and STA 2 may perform channel estimation using reference signals included in the Preamble unit of the DL MU-MIMO signal to extract the signals addressed to the STAs. STA 1 and STA 2 may measure reference quality of the reference signals addressed to the STAs (e.g., referred to as desired signal) and a reference signal addressed to another STA that is spatially multiplexed in the same RU as the STAs (e.g., referred to as inter-user interference signal), in the reference signals included in the Preamble unit of the DL MU-MIMO signal (i.e., non-NDP PPDU), for example.

Note that, an example of the reception quality information includes an error determination result of a desired signal, a signal to interference plus noise ratio (SINR) of the desired signal, a power value of an inter-user interference signal, a desired signal to undesired signal ratio (DUR) between the desired signal and the inter-user interference signal, the amount of change in power of desired signals in between with the previous MU-MIMO signal, the amount of change in power of inter-user interference signals, the amount of change between power of a desired signal in NDP sounding and power of a desired signal in a MU-MIMO signal, or the amount of change in power of inter-user interference signals, for example.

STA 1 and STA 2 perform, with respect to the desired signal and the inter-user interference signal, reception quality determination based on a threshold value, and determine (or judge) the spatial stream to transmit the feedback information, for example (S312). Incidentally, when the desired signal and the inter-user interference signal include a plurality of spatial streams, STA 1 and STA 2 may perform reception quality determination for each of the spatial streams, for example.

STA 1 and STA 2 transmit response signals (e.g., Block ACKs) to the DL MU-MIMO signal, for example (S313). Further, when feedback information to be transmitted is present from the reception quality determination for the desired signal and the inter-user interference signal, each STA may include, in the response signal, a signal requesting transmission of a Trigger frame that prompts the transmission of the feedback information (e.g., Trigger request) and transmit the signal.

When receiving the response signal including the Trigger request from STA 1 and STA 2, the AP performs scheduling for the multi-link feedback and transmits, to each STA, control information on the multi-link feedback included in a Trigger frame of a BFRP by the AP, for example (S314).

STA 1 and STA 2 perform reception processing on the Trigger frame of the BFRP and acquire the control information on the multi-link feedback transmission, for example (S315). STA 1 and STA 2 perform the multi-link feedback on the AP at the timing indicated by the BFRP, for example (S316). By way of example, in the example illustrated in FIG. 29, STA 1 transmits, to the AP, feedback information for link 1 and link 2 by using link 1. Meanwhile, in the example illustrated in FIG. 29, STA 2 transmits, to the AP, the feedback information for link 1 and link 2 by using link 2.

The AP receives the feedback information transmitted from the STAs, for example (S317). The AP may perform re-configuration of the feedback information transmitted via Multi-Link, based on the control information on the multi-link feedback included in the BFRP or the control information included in the feedback information, for example. In addition, the AP may identify, based on the control information included in the feedback information, to which STA the feedback information on the spatial stream is addressed, for example. The AP may update the steering matrix held in the buffer based on the newly acquired feedback information and re-save the steering matrix in the buffer, for example. Further, the AP may change the scheduling for the DL MU-MIMO transmission (e.g., RU allocation or user assignment) based on the feedback information transmitted from STA 1 and STA 2. Further, the AP transmits an ACK signal via each link in accordance with reception processing results on the feedback information, for example (S318).

Incidentally, in FIG. 29, an example has been described in which each STA performs the multi-link transmission of the feedback information acquired from the DL MU-MIMO signal (i.e., non-NDP PPDU) addressed to two STAs, but the present disclosure is not limited to this example, and feedback information acquired from a DL SU signal addressed to a single STA may be transmitted in Multi-Link, as in Staggered sounding, for example.

2. AP 100 may coordinate with a plurality of APs (e.g., referred to as "multi-AP") and indicate, to STA 200, multi-link transmission of feedback information for the respective APs, for example.

Figure 30:
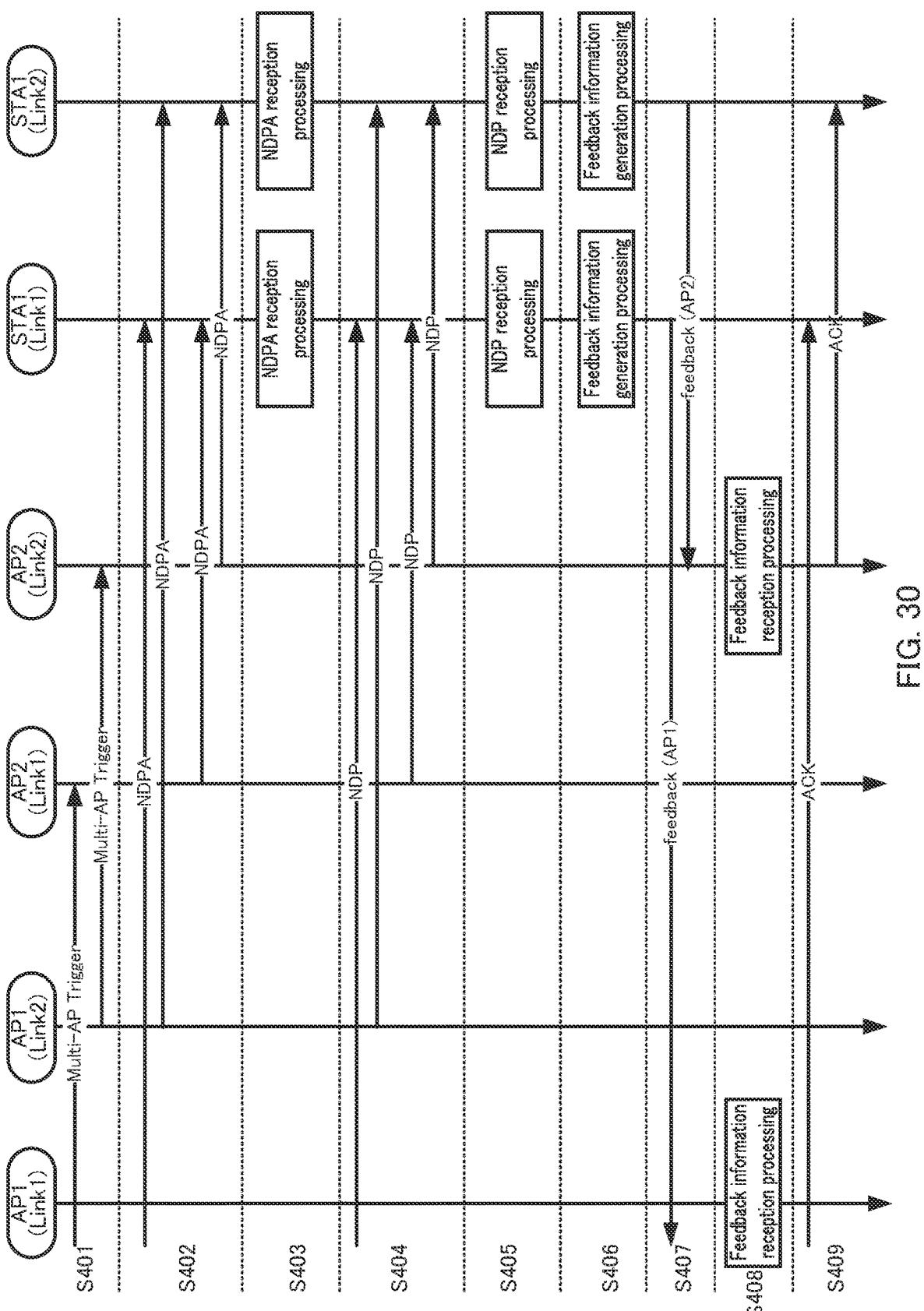
FIG. 30 is a sequence diagram illustrating an exemplary operation of a radio communication system according to another embodiment.

FIG. 30 is a sequence diagram illustrating an exemplary operation in a case where AP 100 indicates (or instructs), to STA 200, the multi-link transmission of the feedback information related to the multi-AP.

In FIG. 30, as an example, a description will be given of an exemplary operation of transmitting feedback information in two APs 100 (e.g., AP 1 and AP 2) each having two links (e.g., link 1 and link 2) and one STA 200 (e.g., STA 1).

The number of links used in the multi-link feedback may be "two" or more. Further, the number of APs to be coordinated as the multi-AP is not limited to two and may be three or more. Further, an STA that indicates the multi-link transmission of the feedback information for the multi-AP is not limited to one and may be two or more.

In FIG. 30, AP 1 that controls the multi-AP transmission transmits a Multi-AP Trigger to AP 2 that performs transmission in coordination with AP 1, for example (S401). The transmission of the Multi-AP Trigger may cause control information on coordinated transmission of an NDPA and an NDP (e.g., information indicating whether to indicate multi-link feedback, transmission timing, or transmission power information, and the like) to be indicated from AP 1 to AP 2.

Each of AP 1 and AP 2 simultaneously transmits an NDPA including the control information on the multi-link feedback and an NDP at a timing when AP 1 indicates the Multi-AP Trigger to AP 2, for example (e.g., S402 and S404).

STA 1 performs reception processing on the NDPAs in each of link 1 and link 2 and acquires control information on the multilink transmission of the feedback information, for example (S402). The STA also performs reception processing on the NDPs in each of link 1 and link 2 (S405), generates a channel estimation value and feedback information for each AP, for example (S406). Further, STA 1 determines, based on the control information included in the NDPA, a link to be used in transmission of the feedback information and transmits the feedback information to the respective APs, for example (S407). In the example illustrated in FIG. 30. STA 1 transmits the feedback information for link 1 and link 2 of AP 1 via link 1, and transmits the feedback information for link 1 and link 2 of AP 2 via link 2.

AP 1 and AP 2 receive the feedback information via link 1 or link 2 (S408) and transmit ACK signals to STA 1 in accordance with reception processing results on the feedback information, for example (S409). AP 1 and AP 2 may transmit the ACK signals in the link in which the feedback information has been received, for example.

3. In Control Method 1 (indication of Link ID), AP 100 may indicate, to STA 200, a link to be used in the feedback transmission in another method different from transmission of a Link ID, for example.

By way of example, the link to be used in the feedback transmission may be indicated, to STA 200, based on a combination of a frequency band (e.g., Bandwidth (BW) or Channel BW) and an channel identifier (e.g., Channel ID).

By way of example, AP 100 may indicate, to STA 200, the frequency band in a BW field and the channel identifier in a Channel ID field, as illustrated in FIG. 31. For example, as illustrated in FIG. 32, a frequency band (e.g., either 2.4 GHz, 5 GHz, or 6 GHz) used for STA 200 may be indicated in a BW field. Further, for example, as illustrated in FIG. 32, a channel ID assigned in ascending order to the channel number (ch) that can be used for each frequency band (in FIG. 32, e.g., 2.4 GHz, 5 GHz, or 6 GHz) indicated in the BW field may be indicated in a Channel ID field.

STA 200 may determine a link (e.g., channel) to be used in the feedback transmission based on a combination of the frequency band and the channel ID indicated from AP 100, for example. In one example, in FIG. 32, when the frequency band is BW=01 (5 GHz) and the channel ID=0001, STA 200 may determine 40 ch corresponding to the combination of BW=01 and channel ID=0001 as the link used in the feedback transmission.

Note that, a value or the number of bits of each of the frequency band and the channel ID indicated in FIG. 32 is exemplary and may be another value or another number of bits.

As another example, a link used in the feedback transmission may be indicated to STA 200 based on a combination of a frequency band (e.g., BW) and an offset value (e.g., channel offset) of a frequency for one link (e.g., link 1) of a plurality of links.

For example, as illustrated in FIG. 33, AP 100 may indicate, to STA 200, the frequency band in a BW field and may indicate, to STA 200, a coefficient for the offset value based on the frequency difference from a center frequency of another link with respect to a center frequency of link 1 in a channel offset field.

Here, for example, as illustrated in FIG. 34, for each frequency band to be indicated to STA 200, the frequency difference between adjacent channels (e.g., Δ Channel frequency) is determined. By way of example, in a 2.4 GHz band, when a difference in center frequencies between link 1 and link 2 is 40 MHz, a frequency offset value is expressed as 40 MHz=5 MHz*8, as a product of the frequency difference between channels, Δ Channel frequency, and the coefficient. Thus, AP 100 may indicate, to STA 200, BW=00 (2.4 GHz) and channel offset=1000 (e.g., eight), for example.

Incidentally, a value or the number of bits of each of the frequency band and the frequency difference between channels illustrated in FIG. 34 is exemplary and may be another value or another number of bits. Meanwhile, control information indicated from AP 100 to STA 200 is not limited to the above-mentioned coefficient and may be information or a parameter indicating a frequency difference from a center frequency of another link with respect to a center frequency of link 1.

4. Information subject to the multi-link transmission is not limited to the feedback information.

For example, STA 200 may perform multi-link transmission of a response signal (e.g., ACK or BA) or a link adaptation signal.

5. In the above embodiments, the exemplary configuration based on the 11ax frame format has been described by way of example, but the format to which an embodiment of the present disclosure is applied is not limited to the 11ax format.

6. Although an operation in DL communication has been described in the above embodiments, an embodiment of the present disclosure may be applied to not only the DL communication but also UL communication or sidelink, for example.

7. The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas. Some non-limiting examples of such a communication apparatus include a phone (e.g. cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

A communication apparatus according to an embodiment of the present disclosure includes: control circuitry, which, in operation, executes control for multi-link transmission, based on control information on the multi-link transmission; and transmission circuitry, which, in operation, performs the multi-link transmission in accordance with the control for the multi-link transmission.

In an embodiment of the present disclosure, the control information includes identification information on a link usable in the multi-link transmission, and the control circuitry determines, based on the identification information, a link to be used in transmission of feedback information in Multi-Link.

In an embodiment of the present disclosure, an information amount of the identification information is based on either one of a previously specified number of links or the number of links that are configured for an access point.

In an embodiment of the present disclosure, the control circuitry determines, based on a rule that is previously specified, a link to which the transmission of the feedback information is assigned in the multi-link transmission.

In an embodiment of the present disclosure, the rule is based on the number of spatial streams included in the feedback information and a frequency bandwidth of each link used in the transmission of the feedback information.

In an embodiment of the present disclosure, the rule is based on a type of the feedback information.

In an embodiment of the present disclosure, the control circuitry determines to use a link that is different from a link in which the control information has been received, in transmission of feedback information in the multi-link transmission.

In an embodiment of the present disclosure, the control circuitry synchronizes, between links, transmission timings of feedback information in the multi-link transmission.

In an embodiment of the present disclosure, the control circuitry makes different, between links, transmission timings of the feedback information in the multi-link transmission.

In an embodiment of the present disclosure, the control circuitry assigns feedback information for each of a plurality of links to a portion of the plurality of links, in the multi-link transmission.

In an embodiment of the present disclosure, the control information includes information on distribution of feedback information for a plurality of inks in the multi-link transmission, and
   the control circuitry determines, based on the information on the distribution, distribution of the feedback information between links in the multi-link transmission.

In an embodiment of the present disclosure, the control information includes information on a spatial stream included in feedback information transmitted via each link.

In an embodiment of the present disclosure, the control information includes information on a frequency band included in feedback information transmitted via each link.

In an embodiment of the present disclosure, the control information includes information on a type of feedback information transmitted via each link.

In an embodiment of the present disclosure, reception circuitry that receives the control information from an access point is further included, and the control circuitry determines, based on the control information, distribution of feedback information to the access point between links in the multi-link transmission.

In an embodiment of the present disclosure, the control information is included in a Trigger frame.

In an embodiment of the present disclosure, the control information is included in a Trigger dependent user info field.

In an embodiment of the present disclosure, the control information is included in a null data packet announcement (NDPA).

In an embodiment of the present disclosure, the transmission circuitry transmits information on distribution of feedback information between links in the multi-link transmission to an access point using the feedback information.

A communication apparatus according to an embodiment of the present disclosure includes: control circuitry, which, in operation, executes control for reception of multi-link transmission performed by another communication apparatus, based on control information on the multi-link transmission; and reception circuitry, which, in operation, performs the reception of the multi-link transmission performed by the other communication apparatus, in accordance with the control for the reception.

A communication method according to an embodiment of the present disclosure includes: executing, by a communication apparatus, control for multi-link transmission based on control information on the multi-link transmission; and performing, by the communication apparatus, the multi-link transmission in accordance with the control for the multi-link transmission.

A communication method according to an embodiment of the present disclosure includes: executing, by a communication apparatus, control for reception of multi-link transmission performed by another communication apparatus, based on control information on the multi-link transmission; and performing, by the communication apparatus, the reception of the multi-link transmission performed by the other communication apparatus, in accordance with the control for the reception.

The disclosure of Japanese Patent Application No. 2020-143901, filed on Aug. 27, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 AP
101-1, 101-2, 201-1, 201-2 Radio receiver
102 Received signal decoder
103 Feedback information re-configurator
104 Multi-link scheduler
105 Data generator
106 Preamble generator
107-1, 107-2, 206-1, 206-2 Radio transmitter
200 STA

202-1, 202-2 Preamble demodulator
203-1, 203-2 Data decoder
204 Multi-link controller
205 Transmission signal generator
The invention claimed is:

1. A non-Access Point Multi-Link Device (non-AP MLD) including a plurality of affiliated stations (STAs) corresponding to a plurality of links, the non-AP MLD comprising:
   a first receiver, which, in operation, receives a first signal from an AP MLD on a first link and performs channel estimation of the fist link, the first signal including multi-link feedback control information;
   a second receiver, which, in operation, receives a second signal from the AP MLD on a second link and performs channel estimation of the second link;
   control circuitry, which, in operation, determines one or more links used for transmission of feedback information and determines allocation of the feedback information to the one or more links, based on the multi-link feedback control information, and generates the feedback information including results of the channel estimation of the first link and the second link; and
   a transmitter, which, in operation, transmits the feedback information on the one or more links.

2. The non-AP MLD according to claim 1, wherein an information amount of identification information on the one or more links is based on either one of a previously specified number of links or the number of links that are configured for the AP MLD.

3. The non-AP MLD according to claim 1, wherein the control circuitry determines, based on a rule that is previously specified, the one or more links.

4. The non-AP MLD according to claim 3, wherein the rule is based on the number of spatial streams included in the feedback information and a frequency bandwidth of each of the one or more links used in the transmission of the feedback information.

5. The non-AP MLD according to claim 3, wherein the rule is based on a type of the feedback information.

6. The non-AP MLD according to claim 1, wherein the control circuitry determines to use a link that is different from a link in which the multi-link feedback control information has been received, in transmission of the feedback information.

7. The non-AP MLD according to claim 1, wherein the control circuitry synchronizes, between the one or more links, transmission timings of the feedback information.

8. The non-AP MLD according to claim 1, wherein the control circuitry makes different, between the one or more links, transmission timings of the feedback information.

9. The non-AP MLD according to claim 1, wherein the control circuitry assigns the feedback information for each of the plurality of links to a portion of the plurality of links.

10. The non-AP MLD according to claim 1, wherein:
    the multi-link feedback control information includes information on distribution of the feedback information for the plurality of links, and
    the control circuitry determines, based on the information on the distribution, distribution of the feedback information between the one or more links.

11. The non-AP MLD according to claim 10, wherein the multi-link feedback control information includes information on a spatial stream included in the feedback information transmitted via each of the one or more links.

12. The non-AP MLD according to claim 10, wherein the multi-link feedback control information includes information on a frequency band included in the feedback information transmitted via each of the one or more links.

13. The non-AP MLD according to claim 10, wherein the multi-link feedback control information includes information on a type of the feedback information transmitted via each of the one or more links.

14. An Access Point Multi-Link Device (AP-MLD) including a plurality of affiliated stations (STAs) corresponding to a plurality of links, the AP-MLD comprising:

a first transmitter, which, in operation, transmits a first signal to a non-AP MLD on a first link, the non-AP MLD performing channel estimation of the first link, and the first signal including multi-link feedback control information;

a second transmitter, which, in operation, transmits a second signal to the non-AP MLD on a second link, the non-AP MLD performing channel estimation of the second link;

control circuitry, which, in operation, determines one or more links used for reception of feedback information and determines allocation of the feedback information to the one or more links, based on the multi-link feedback control information, the feedback information including results of the channel estimation of the first link and the second link; and a receiver, which, in operation, receives the feedback information on the one or more links.

15. A communication method performed by a non-Access Point Multi-Link Device (non-AP MLD) including a plurality of affiliated stations (STAs) corresponding to a plurality of links, the communication method comprising:

receiving a first signal from an AP MLD on a first link and performing channel estimation of the fist link, the first signal including multi-link feedback control information;

receiving a second signal from the AP MLD on a second link and performing channel estimation of the second link;

determining one or more links used for transmission of feedback information and determining allocation of the feedback information to the one or more links, based on the multi-link feedback control information, and generating the feedback information including results of the channel estimation of the first link and the second link; and transmitting the feedback information on the one or more links.

16. A communication method performed by an Access Point Multi-Link Device (AP MLD) including a plurality of affiliated stations (STAs) corresponding to a plurality of links, the communication method comprising:

transmitting a first signal to a non-AP MLD on a first link, the non-AP MLD performing channel estimation of the first link, and the first signal including multi-link feedback control information;

transmitting a second signal to the non-AP MLD on a second link, the non-AP MLD performing channel estimation of the second link;

determining one or more links used for reception of feedback information and determining allocation of the feedback information to the one or more links, based on the multi-link feedback control information, the feedback information including results of the channel estimation of the first link and the second link; and receiving the feedback information on the one or more links.

* * * * *